(12) United States Patent
Gargiulo et al.

(10) Patent No.: US 12,009,015 B2
(45) Date of Patent: Jun. 11, 2024

(54) SMART CREATIVE FEED

(71) Applicant: Ready Set, Inc., San Mateo, CA (US)

(72) Inventors: John Gargiulo, Menlo Park, CA (US); Sambou Makalou, San Francisco, CA (US)

(73) Assignee: READY SET, INC., San Mateo, CA (US)

( * ) Notice: Subject to any disclaimer, the term of this patent is extended or adjusted under 35 U.S.C. 154(b) by 0 days.

(21) Appl. No.: 17/704,060

(22) Filed: Mar. 25, 2022

(65) Prior Publication Data

US 2022/0310127 A1 Sep. 29, 2022

Related U.S. Application Data

(60) Provisional application No. 63/166,313, filed on Mar. 26, 2021.

(51) Int. Cl.
*G11B 27/036* (2006.01)
*G06Q 30/0241* (2023.01)
(Continued)

(52) U.S. Cl.
CPC ....... *G11B 27/036* (2013.01); *G06Q 30/0276* (2013.01); *G06V 10/761* (2022.01);
(Continued)

(58) Field of Classification Search
USPC .................................................. 386/278–290
See application file for complete search history.

(56) References Cited

U.S. PATENT DOCUMENTS

2012/0054617 A1* 3/2012 Bachman ................ G06F 16/40
715/723
2013/0272679 A1* 10/2013 Cavalcanti ........... G11B 27/034
386/282
(Continued)

OTHER PUBLICATIONS

International Search Report and Written Opinion in PCT/US22/21849, dated Jun. 21, 2022, 17 pages.
(Continued)

*Primary Examiner* — Hung Q Dang
(74) *Attorney, Agent, or Firm* — Rothwell, Figg, Ernst & Manbeck, P.C.

(57) ABSTRACT

According to one aspect, a computer-implemented method for automatically generating a video advertisement is provided. The method includes obtaining one or more attributes relating to a video advertisement. The method includes obtaining a template, wherein the template comprises one or more blocks, wherein each block of the one or more blocks comprises one or more placeholders corresponding to one or more types of media assets. The method includes identifying, in a first block of the one or more blocks in the template, a first placeholder corresponding to a first type of media asset. The method includes selecting a first media asset from a first media library based on first metadata associated with the first media asset, the one or more attributes, and the first type of media asset. The method includes generating, using a rendering engine, a video advertisement, wherein the generated video advertisement comprises the first asset. The method includes outputting the generated video advertisement.

20 Claims, 22 Drawing Sheets

(51) Int. Cl.
    *G06V 10/74*     (2022.01)
    *G06V 20/40*     (2022.01)
    *G11B 27/00*     (2006.01)
    *G11B 27/031*     (2006.01)
    *G11B 27/34*     (2006.01)

(52) U.S. Cl.
    CPC ............ *G11B 27/002* (2013.01); *G11B 27/34* (2013.01); *G06V 2201/10* (2022.01)

(56) References Cited

U.S. PATENT DOCUMENTS

| | | |
|---|---|---|
| 2014/0040019 A1 | 2/2014 | Zheng et al. |
| 2014/0279263 A1* | 9/2014 | Liu .................... G06Q 30/0627 705/26.63 |
| 2014/0380380 A1* | 12/2014 | Heller ................ H04N 21/4725 725/58 |
| 2016/0104202 A1* | 4/2016 | Greenberg ............ G06F 3/0482 705/14.64 |
| 2017/0201562 A1* | 7/2017 | Moon ................. G06F 16/9535 |
| 2019/0114661 A1 | 4/2019 | Bennion et al. |
| 2019/0158905 A1 | 5/2019 | Bou Balust et al. |
| 2019/0311743 A1* | 10/2019 | Shen ................. H04N 21/8549 |
| 2021/0042796 A1* | 2/2021 | Khoury .............. G06Q 30/0205 |
| 2022/0262406 A1* | 8/2022 | Daugherty ........... G11B 27/031 |

OTHER PUBLICATIONS

International Preliminary Report and Written Opinion for PCT/US2022/021849 dated Oct. 5, 2023, 8 pages.

\* cited by examiner

700

Brand attributes
the place to gather all brand attributes that we should be able to use in the stitcher MVP

[Select Brand ▼]  [Submit]

701A — Logos
[🖼] [🖼]

701B — Fonts
Primary Font  Secondary Font
[Georgia 📎]  [Upload font file 📄]

701C — Color Palette
Primary Background Color  Primary Text Color
[#DA0064 ☐]  [#FFFFFF ☐]

701D — Talent details
Age [Select ▼]
Gender [Select ▼]
Body Type [Select ▼]
Hair Color [Select ▼]
Ethnicity [Select ▼]

701E — Footage details
Content Type [Select ▼]
Location Type [Select ▼]
Production Team [Select ▼]
Keywords [comma separated values]

701F — Footage details - specific placing and function
[Placing ▼] [Function ▼] [Type ▼]  ⊕
Content Type [Select ▼]
Location Type [Select ▼]
Production Team [Select ▼]
Keywords [comma separated values]

[Opener ▼] [Function ▼] [Video ▼]  ⊖
Content Type [Select ▼]
Location Type [Select ▼]
Production Team [Select ▼]
Keywords [hair, outdoor]

FIG. 7

| Select | AD ID | Preview | ADSet ID | ADSet Name | Campaign ID | 3 second video view | Video average play time | Campaign budget | Adset Budget | Spend | Impressions | Clicks |
|---|---|---|---|---|---|---|---|---|---|---|---|---|
| | METRICS SUMMARY >>> | | | | | 112,534, 403 | 00:01 .266 | $72,712 .60 | $5,553 .56 | $9,320, 964.70 | 1,706, 049,285 | 12,126, 994 |
| | 23846384 685790551 801A | | 23846375 462210551 | Quiz Completes 11-30D | 238463456 92740551 | 1 | 00:05 | $1,000.00 | $0.00 | $0.00 | 1 | 0 |
| | 23845365 925470551 801B | | 23845365 682610551 | ROW 30D Body Website Visitors | 238453656 70470551 | 3 | 00:04 | $0.00 | $250.00 | $0.13 | 3 | 0 |
| | 23844523 493280551 801C | | 23844523 493210551 | 3.17 ATC 7D | 23844523 493400551 | 1 | 00:06 | $0.00 | $250.00 | $0.00 | 1 | 0 |
| | | | | Madelaine | | | | | | | | |

| | | | | | | | |
|---|---|---|---|---|---|---|---|
| Hit Ad | Smart Ad | | How are (My Tiktok ads ∨) with (Fewer than 20 characters ∨) doing compared to (ALL Tiktok ads ∨) ? | How are (All my ads ∨) that use the (Save money ∨) messaging doing in (Cost per lead ∨) compared to (My vertical's Average ad ∨) ? | How are (My Facebook ads ∨) that use (Animation ∨) doing in (CTR ∨) vs. (My ads ∨) that use Live-action? | | |
| Landing Page URL | | | | | | | |
| Select | ∨ | | FIND OUT > | 908A ANSWER > | 908C ANSWER > | | |
| Vertical | | | | | | | |
| Gaming | ∨ | | MESSAGING | WHAT'S WORKING | 908B | | |
| Insight 906 | | | How are (All my ads ∨) that use the (Save money ∨) messaging doing in (Cost per lead ∨) compared to (My vertical's Average ad ∨) ? | Which tags are most correlated with (CTR % ∨) for my (Instagram Ads ∨) ? | | | |
| With 94% confidence we can say that Stop Motion is getting you lower CPAs than live -action. | | | ANSWER > | 908D ANSWER > | | | |
| GET MORE INSIGHTS >> | | | | 908E | | | |
| Custom | | | | | | | |
| Custom Metrics | | | | | | | |
| CPC above $1 | ⊖ ⊗ | | | | | | |
| CPC below $10 | ⊖ ⊗ | | | | | | |
| CPM higher than $1k | ⊖ ⊗ | | | | | | |
| Create new metric | | | | | | | |

| | | | | | | | | Manage Table + | ☐☐ Tile View | ☒ Full Screen |
|---|---|---|---|---|---|---|---|---|---|---|
| DETAILS ⊂⊃ Agregate by | | | | | | | | | | |
| SELECT∨ | ACTIVE∨ | PREVIEW∨ | CHANNEL∨ | SHORT∨ NAME | AD NAME ∨ | BY∨ | HEADLINE ∨ | DISCRIPTION∨ | BODY ∨ | AD CTA |
| METRICS AVERAGE >>> | | | | | | | | | | |
| ⊖ | ⊙ | | ⓘ (f) | Pickup_ Promo_011 | T_012120_ video_19_Q3_ PS011_what- you-think... (Option... | △ | Lorem ipsun dolor sit amet, consectetur adipicing elit... | Lorem ipsun dolor sit amet, consectetur adipicing elit... | Lorem ipsun dolor sit amet, consectetur adipicing elit... 910A | Swip up |
| ⊖ | ⊙ | | (f) | Pizza_S Promo_021 | T_012120_ video_19_Q3_ PS011_what- you-think... (Option... | △ | Lorem ipsun dolor sit amet, consectetur adipicing elit... | Lorem ipsun dolor sit amet, consectetur adipicing elit... | Lorem ipsun dolor sit amet, consectetur adipicing elit... 910B | Order Now |

FIG. 9B

| ATTRIBUTES | CPC CORR | CPC - | CPC + | CORR TYPE | DIVERSITY SCORE | TAG COUNT | COUNT PERCENTAGE | SAMPLE SIZE SCORE | CONFIDENCE SCORE | HOW MANY TO ADD? | STATUS |
|---|---|---|---|---|---|---|---|---|---|---|---|
| Visual Style (3s)_Looped/Boomerang | -0.23 | -0.23 | -0.23 | None | 0.77 | 28 | 0.77 | 0.77 | 0.77 | 2 | Neutral |
| Visual Style (3s)_Live Action video | -0.21 | -0.21 | -0.21 | None | 0.77 | 12 | 0.77 | 0.77 | 0.77 | 10 | Neutral |
| Visual Style (3s)_Ugc | -0.19 | -0.19 | -0.19 | None | 0.77 | 34 | 0.77 | 0.77 | 0.77 | 1 | Neutral |
| Visual Style (3s)_slideshow/carousel | -0.19 | -0.19 | -0.19 | None | 0.71 | 20 | 0.71 | 0.71 | 0.71 | 0 | Avoid |
| Visual Style (3s)_timelapse | -0.18 | -0.18 | -0.18 | None | 0.68 | 7 | 0.68 | 0.68 | 0.68 | 0 | Neutral |
| Visual Style (3s)_typography | -0.13 | -0.13 | -0.13 | None | 0.55 | 9 | 0.55 | 0.55 | 0.55 | 6 | Explore |
| Visual Style (3s)_cinemagraph | -0.12 | -0.12 | -0.12 | None | 0.54 | 11 | 0.54 | 0.54 | 0.54 | 7 | Explore |
| Visual Style (3s)_still photography | -0.10 | -0.10 | -0.10 | Moderate Negative | 0.54 | 28 | 0.54 | 0.54 | 0.54 | 0 | Explore |
| Visual Style (3s)_stop motion | -0.06 | -0.06 | -0.06 | Moderate Negative | 0.50 | 12 | 0.50 | 0.50 | 0.50 | 11 | Neutral |
| Visual Style (3s)_3d animation | -0.03 | -0.03 | -0.03 | None | 0.49 | 34 | 0.49 | 0.49 | 0.49 | 15 | Avoid |
| Visual Style (3s)_motion graphic animation | -0.02 | -0.02 | -0.02 | None | 0.43 | 21 | 0.43 | 0.43 | 0.43 | 7 | Neutral |

Orginal

Ronnie_Unboxing.MOV

| | |
|---|---|
| Brands | 956596827756245 |
| Content Type | lifestyle<br>product-any<br>product-in-use<br>product-packaging<br>product-unboxing<br>shows-benefit<br>ugc-b-roll<br>ugc-testimonial |
| Location Type | house |
| Production Team | ugc |
| Actors | Ronnie |
| Custom Tags | Shoot Date<br>• 2021/10/21 |
| Keywords | person<br>home-decor<br>couch<br>furniture<br>face<br>human<br>clothing<br>apparel |
| Format | undefined x undefined |
| Quality | high |

FIG. 13

Assisted Searching
Select your desired info to get similar media as a result

Footage details

| | |
|---|---|
| Brand | Select |
| Content Type | Select |
| Location Type | Select |
| Production Team | Select |
| Keywords | comma separated values |

Talent details

| | |
|---|---|
| Age | Select |
| Gender | Select |
| Body Type | Select |
| Hair Color | Select |
| Ethnicity | Select |

Find similar media! — 1402

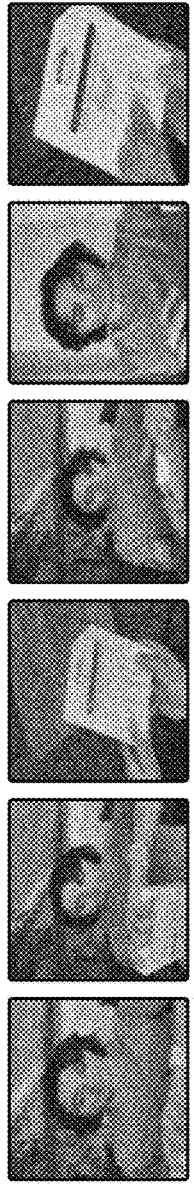

Similar Type 1 View more company_id: "9565968277562455"
id: "35ed5292-b785-4670-8ba8-2a392a0552fa"
▶ images: {...}
▶ keywordsMatches: ["apparel", "clothing", "face", "human", "person"]
kwscore: "5"
score: "23"
▶ tagMatches: [{id: {$oid: "60d208a26ae7c6216f57f197"}, name: "Lifestyle",...},...]
▶ talentMatches: [{_id: {$oid: "60d2089c6ae7c620df3385c4"},...}, {_id: {$oid: "60d208a46ae7c621950633c9"},...},...]
talscore: "5"
tscore: "13"

FIG. 15A

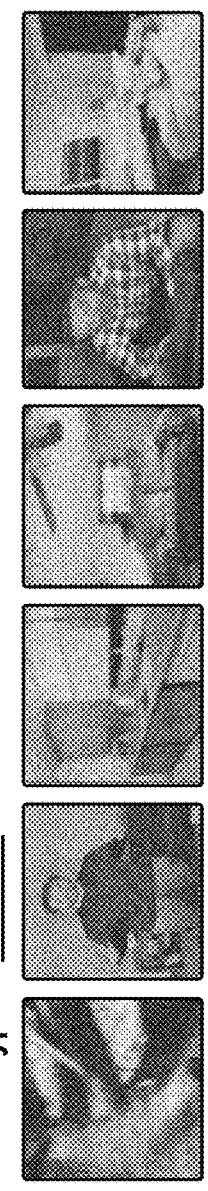

Similar Type 2 View more

▼ keywordsMatches: ["apparel", "clothing", "face", "human", "person"]
  0: "apparel"
  1: "clothing"
  2: "face"
  3: "human"
  4: "person"

FIG. 15B

Similar Type 4 View more

▼talentMatches: [ {_id: {$oid: "60d2089c6ae7c620df3385c4"}, ...}, {_id: {$oid: "60d208a46ae7c621950633c9"}, ...}, ...]
▶ 0: {_id: {$oid: "60d2089c6ae7c620df3385c4"}, ...}
  ▲ category: {_id: {$oid: "60d208496ae7c614aa5c35c7"}, custom: false, name: "Age"}
  ▲ count: 40
  ▲ custom: false
  ▲ name: "17-30"
  ▲ types: ["talent", "image"]
  ▲ _id: {$oid: "60d2089c6ae7c620df3385c4"}
  ▲ 1: {_id: {$oid: "60d208a46ae7c621950633c9"}, ...}
  ▲ 2: {_id: {$oid: "60d208a56ae7c6229937c1e2"}, ...}
  ▲ 3: {_id: {$oid: "60d208a56ae7c6229937c1e4"}, ...}
  talscore: "4"

SMART CREATIVE FEED

CROSS REFERENCE TO RELATED APPLICATIONS

This application claims the benefit of U.S. Provisional Application No. 63/166,313 filed Mar. 26, 2021. The entire contents of the above-identified application are hereby fully incorporated herein by reference.

TECHNICAL FIELD

Aspects of the present disclosure relate to automated generation and validation of creative video feeds.

BACKGROUND

For digital marketers, producing creative for digital platforms like Facebook, Instagram, TikTok and other platforms is a manual process, especially when it comes to video production and post-production. In order to create these advertisements, digital marketers need to ideate what to make, guessing at what type of creative their audience will respond to, capture footage, edit that footage and figure out how to test and learn from it on social channels. It is so onerous that a consistent feedback loop of testing and learning does not happen almost anywhere, including large startups and public companies, despite them very much wanting to do so.

SUMMARY

Aspects of the present disclosure relate to a Smart Creative Feed designed to automate the onerous tasks of ideating, creating video footage, and testing video footage for purposes of digital advertising. The Smart Creative Feed leverages a library of performance marketing-focused footage in a database, which may include lifestyle footage of busy people, people getting in and out of cars, people looking at their phones, etc. The Smart Creative Feed automatically assembles video advertisements ads to post on an account or platform and test. This cuts the time to ideate, shoot and edit ads from 6-8 weeks to 6-8 minutes.

According to one aspect, a method for automatically generating video advertisements is provided. The method includes obtaining a plurality of blocks of video footage, wherein each block is associated with video metadata comprising a plurality of tags and one or more video metrics. The method includes determining a performance value for each tag in the plurality of tags based on the video metadata and video metrics for each of the plurality of blocks. The method includes selecting a tag from the plurality of tags based on the determined performance value. The method includes selecting a block from the plurality of blocks based on the selected tag. The method includes generating a video advertisement, wherein the generated video advertisement comprises the selected block. The method includes testing the generated video advertisement on an advertisement platform. The method includes modifying the generated video advertisement based on the testing.

According to another aspect, a computer-implemented method for automatically generating a video advertisement is provided. The method includes obtaining one or more attributes relating to a video advertisement. The method includes obtaining a template, wherein the template comprises one or more blocks, wherein each block of the one or more blocks comprises one or more placeholders corresponding to one or more types of media assets. The method includes identifying, in a first block of the one or more blocks in the template, a first placeholder corresponding to a first type of media asset. The method includes selecting a first media asset from a first media library based on first metadata associated with the first media asset, the one or more attributes, and the first type of media asset. The method includes generating, using a rendering engine, a video advertisement, wherein the generated video advertisement comprises the first asset. The method includes outputting the generated video advertisement.

In some embodiments, the one or more types of media assets comprise one or more of video, audio, image, or text.

In some embodiments, the method further includes identifying, in a second block of the one or more blocks in the template, a second placeholder corresponding to a second type of media asset. The method further includes selecting a second media asset in a second media library based on second metadata associated with the second media asset, the one or more attributes, and the second type of media asset, wherein the generating comprises generating a first block of video comprising the first asset and a second block of video comprising the second asset. In some embodiments, the first block corresponds to a first temporal position in the generated video advertisement and the second block corresponds to a second temporal position in the generated video advertisement different than the first temporal position.

In some embodiments, the method further includes identifying in the first block a second placeholder corresponding to a second type of media asset different than the first type of media assets. The method further includes selecting a second media asset in a second media library based second metadata associated with the second media asset, the one or more attributes, and the second type of media asset, wherein the generating comprises generating a first block of video comprising the first asset and the second asset. In some embodiments, the first type of media asset is different than the second type of media asset.

In some embodiments, the method includes outputting the generated video advertisement to an advertisement platform. The method further includes obtaining one or more testing metrics for the generated video advertisement. The method further includes modifying the generated video advertisement based on the one or more testing metrics. In some embodiments, the modifying comprises generating, using the rendering engine, a second video advertisement, wherein the second video advertisement comprises at least one of: a second media asset different than the first media asset, a temporal ordering of the first media asset and a second media asset different than an original temporal ordering of the first media asset and the second media asset in the generated video advertisement, a combination of the first media asset and a second media asset different than an original combination of the first media asset and a second media asset in the generated video advertisement, or a placement of the first media asset different than an original placement of the first media asset in the first generated media advertisement.

In some embodiments, the selecting the first media asset is further based on one or more performance metrics associated with the first media asset.

In some embodiments, the obtaining one or more attributes relating to a video advertisement includes: obtaining video footage associated with a first user; breaking the video footage into a plurality of blocks of video footage, wherein each block comprises one or more media assets; and generating, for each media asset of the one or more media assets, metadata comprising the one or more attributes. In some embodiments, the generating includes using a machine learning model to identify the one or more attributes.

In some embodiments, the selecting the first media asset includes determining that the first media asset has a type that is the same as the first type of media asset.

In some embodiments, the selecting the first media asset includes calculating a similarity score between the obtained one or more attributes and one or more attributes in the first metadata. In some embodiments, the calculating the similarity score includes: calculating a first similarity score between the obtained one or more attributes and the one or more attributes in the first metadata based on a first criteria; calculating a second similarity score between the obtained one or more attributes and the one or more attributes in the first metadata based on a second criteria; and combining the first similarity score and the second similarity score.

In yet another aspect, a method for automatically generating video advertisements is provided. The method includes obtaining a plurality of blocks of video footage, wherein each block is associated with video metadata comprising a plurality of tags and one or more video metrics. The method includes determining a performance value for each tag in the plurality of tags based on the video metadata and video metrics for each of the plurality of blocks. The method includes selecting a tag from the plurality of tags based on the determined performance value. The method includes selecting a block from the plurality of blocks based on the selected tag. The method includes generating a video advertisement, wherein the generated video advertisement comprises the selected block. The method includes outputting the generated video advertisement.

In some embodiments, the method further includes obtaining video footage associated with a first user; breaking the video footage into a plurality of blocks of video footage, wherein each block comprises one or more media assets; generating, for each media asset of the one or more media assets, metadata comprising a plurality of tags; and storing, in one or more media libraries, the one or more media assets and the generated metadata.

In some embodiments, the determining a performance value for each tag in the plurality of tags includes performing a correlation and regression analysis on the video metadata and video metrics for each of the plurality of blocks.

In some embodiments, the advertisement platform includes a social media account, wherein the testing the generated video advertisement on the advertisement platform includes: submitting the generated video advertisement to the advertisement platform through an application programming interface (API); and obtaining performance information from the advertisement platform from the API.

In some embodiments, the generating the video advertisement further includes: obtaining, from a copy library, a plurality of advertisement texts, wherein each advertisement text is associated with copy metadata comprising one or more copy metrics; selecting an advertisement text from the plurality of advertisement texts based on the copy metrics; and superimposing the selected advertisement text on the generated video advertisement.

In some embodiments, the generating the video advertisement further includes: obtaining, from an audio library, a plurality of audio files, wherein each audio file is associated with audio metadata; selecting an audio file from the plurality of audio files based on the audio metadata; and combining the selected audio file with the generated video advertisement.

In some embodiments, the metadata for a block of video footage comprises a plurality of tags relating to content displayed in the block of video footage.

In another aspect, a system is provided. The system includes one or more processors and a non-transitory computer-readable medium coupled to the processor. The one or more processors are configured to perform any one of the methods recited above.

In another aspect, a computer program product is provided. The computer program product includes a non-transitory computer readable medium including computer readable instructions that, when executed by one or more processors, cause the one or more processors to perform any one of the methods recited above.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

FIG. 7 is a screen capture of a user interface, according to some embodiments.

FIG. 8 is a screen capture of a user interface, according to some embodiments.

FIGS. 9A-B are screen captures of a user interface, according to some embodiments.

FIG. 10 is a screen capture of a user interface, according to some embodiments.

FIG. 11 is a screen capture of a user interface, according to some embodiments.

FIG. 12 is a screen capture of a user interface, according to some embodiments.

FIG. 13 is a screen capture of a user interface, according to some embodiments.

FIG. 14 is a screen capture of a user interface, according to some embodiments.

FIGS. 15A-D illustrate example similarity scores, according to some embodiments.

DETAILED DESCRIPTION

Producing creative for digital platforms is a tedious, manual process, especially when it comes to video production. Aspects of the present disclosure improve the video production process by leveraging a library of video content divided into blocks, where each block is tagged with metadata. Blocks may be seamlessly stitched together to create a creative video, and the creative video may be further augmented using text content from a copy library and/or audio content from an audio library. Unlike traditional tedious and time-consuming creative processes, aspects of the present disclosure may leverage artificial intelligence and machine learning techniques to suggest a specific set of features for a new creative in order to optimize one or more performance data metrics.

Figure 1:
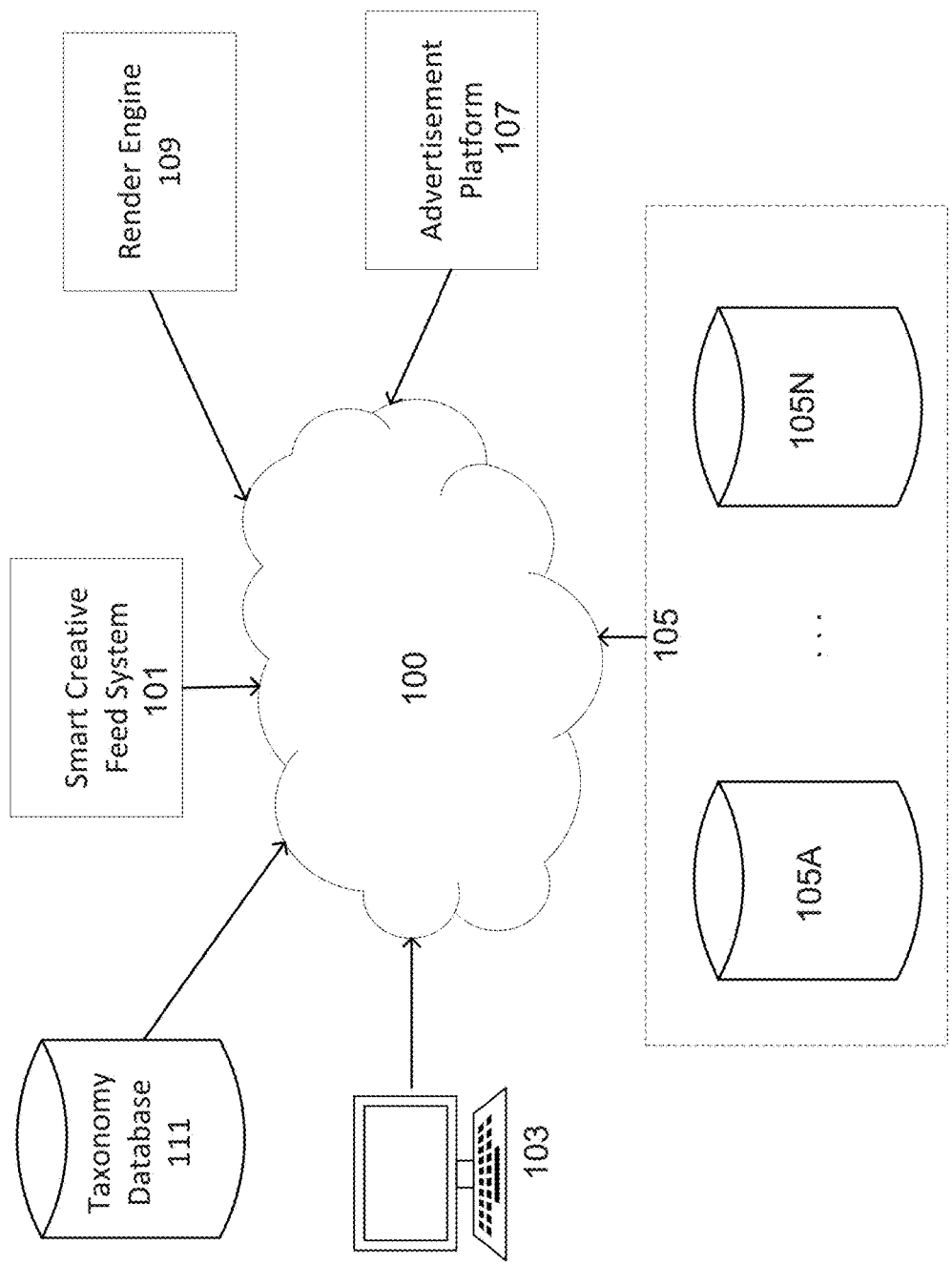
FIG. 1 is a block diagram, according to some embodiments.

FIG. 1 is a block diagram, according to some embodiments. Smart creative feed system 101 may be in direct or indirect electronic communication with an advertisement platform 107, one or more data stores 105A-N, a render engine 109, a taxonomy database 111, and a user terminal 103 over a network 100, such as a public or private communications network (e.g., the Internet). For illustrative purposes, advertisement platform 107 may be a social network or other digital platform where digital content, including advertisements, can be shared, posted, and otherwise disseminated to potential viewers. User terminal 103 may include a computer, tablet, mobile device, desktop, laptop, or other device. As described in further detail below, the smart creative feed system 101 may be in communication with one or more data stores 105A-N, a render engine 109, and a taxonomy database 111. In some embodiments, the one or more data stores 105A-N, the render engine 109, and/or taxonomy database 111 are co-located with smart creative feed system 101, and in other embodiments, all or a portion of the data stores 105A-N, render engine 109, and/or taxonomy database 111 may be remotely accessed by smart creative feed system 101 over network 100. As described in further detail below, data stores 105A-N may include a video library, copy library, audio library, performance library, image library, and/or other data source that may be relevant to the automated generation of creative video content. The performance library may include performance data on how each creative (e.g., video ad) has performed, and can be mapped to video ads, footages, blocks, copy, and music in their respective libraries.

As one example of the Smart Creative Feed system 101 in practice, a ridesharing company may want to get more customers (riders) to join its platform. Without the Smart Creative Feed system, the company would manually come up with creative ideas they think might attract riders, hire an agency or in-house team to go shoot them, edit them, run them on social media to see which ones perform best and hope for good results. This is an onerous process and typically results in just a handful of one-off, project-based attempts each quarter if they are fast. For example, the whole creative process may take upwards of 6-8 weeks for even a relatively simple creative, and often much longer.

According to some embodiments, the ridesharing company may upload all of their footage to the Smart Creative Feed system 101, which may be combined with additional footage. The footage may include, for example, car shots, drivers, app screenshots-on-phone, airport pickups, etc., and be stored in a video library (e.g., one of data stores 105).

In some embodiments, a user operating user device 103 may upload one or more advertisements or components of advertisements to the smart creative feed system 101. For example, the user may upload advertisements footage. The smart creative feed system 101 automatically breaks up the footage into "blocks" by automatically identifying the location of cuts and segmenting out the video between cuts as a block. In some embodiments, footage may be manually broken into "blocks" by human editors. If not already broken up into blocks, any additional footage may be broken into blocks. These are the pieces of footage or building blocks of future video ads for an advertisement platform. Each block may be further broken down into one or more assets, such as audio, video, copy/text, or images, which are stored in a respective data store 105A-N. In some embodiments, the user may upload assets directly to the smart creative feed system 101, such as images of the product, audio files, copy, etc.

The footage, block, and/or asset is tagged with information. Taxonomy database 111 contains a taxonomy of information, or metadata, relevant to the assets stored in the one or more data stores 105A-N. For example, the metadata may include one or more attributes, such as keywords, tags, and talent tags. Keywords include general information describing the asset stored in data stores 105A-N, for example, "tabletop," "tub," rocket," "bathtub," "vehicle," "transportation," and the like. In some embodiments, keywords are automatically generated using machine learning tools as described below. Tags include information about the production of the assets stored in data stores 105A-N, such as how the asset was recorded, the way a product or component is being shown in the asset (e.g., location), production team, etc., as well as descriptions of the content. For example, tags may include content type (e.g., shows benefit, testimonial), location type (e.g., house), and production team. In some embodiments, tags may be generated by human authors. Talent tags include information about talents (e.g., people) contained in the asset, such as their physical experience, age, gender, skills, etc.

In some embodiments, the tagging is performed manually by humans, and in other embodiments, the tagging is performed automatically (e.g., using machine learning applications to identify features in the frames of video footage, copy, or audio). For example, in some embodiments, tagging may be performed automatically with one or more machine learning tools, such as an AWS Rekognition for images analysis, that identifies objects, gestures, actions, and other features of an asset. There may be over 100 tags associated with each piece of footage, block, and/or asset, e.g., "Is this shot in a studio, outdoors, in a house, in an office or other?" "How many people appear?" This creates metadata for all assets in the system. For example, footage, blocks, and/or assets may be tagged with metadata relating to one or more of content type, (e.g., testimonial, product, benefits/problems), direct response (e.g., problem/solution, flip the script, desirable situation), core benefit shown/implied (e.g., survival, enjoyment, companionship, comfort), evidence types (e.g., facts and figures, testimonials, research, endorsements), reason to act (e.g., limited time price/discount or offer, low stock, scarcity), duration, visual style, duration, actor(s) information, and location, among other information.

In addition to any customer-specific blocks from the ridesharing customer, the system may host thousands of other blocks from past clients whose licenses to those footages has run out. For example, a 3 second block of footage of someone stuck in traffic that was shot for an auto insurance brand two years ago may be included for consideration for the ridesharing customer ads.

In some embodiments, smart creative feed system 100 includes a recommendation engine. In some embodiments, the recommendation engine determines a similarity score between two assets. In some embodiments, determining the similarity score includes identifying a match between one or more obtained attributes and one or more attributes of an asset in the data stores 105A-N, such as the keywords, tags, and talent tags. In some embodiments, a customer provides the one or more obtained attributes, and in other embodiments the one or more obtained attributes may be inferred or obtained through other means.

For example, in some embodiments, a customer may provide example footage or an existing advertisement. Smart creative feed system 100 identifies or generates attributes associated with the example footage or existing advertisement and determines a similarity score between the example footage or existing advertisement and one or more assets stored in data stores 105A-N. The attributes may include, for example, one or more of the keywords, tags, and talent tags discussed above. The similarity may be based on one or more different criteria. For example, the similarity score may be determined by matching keywords of the example footage or existing advertisement and keywords of one or more assets in data stores 105A-N (e.g., matching keywords such as apparel, clothing, face, human, and/or person). The similarity score may be determined by matching tags of the example footage or existing advertisement and tags of one or more assets in data stores 105A-N (e.g., matching content type, location type, etc.). The similarity score may be determined by matching talent tags of the example footage or existing advertisement and talent tags of one or more assets in data stores 105A-N. In some embodiments, the similarity score is based on combining similarity scores based on one or more different criteria. In some embodiments, the similarity scores based on different criteria may be promoted or demoted when combined to determine a final similarity score. For example, keyword matches may be provided more weight than tag matches.

Render engine 109 may comprise one or more video handling libraries that generates a new video advertisement. Render engine 109 may combine assets selected by the recommendation engine of smart creative feed system 101. In some embodiments, the render engine 109 may include video handling libraries, such as FFMPEG, Puppeteer, and others to manipulate the length, size, aspect ratio, resolution, etc. of the selected assets and combine them into a new video.

In some embodiments, to "produce" ads, the system reads the meta-information from each visual block, chooses from a Copy Library to superimpose copy over each block. The copy may refer to text data. In addition, the system may choose audio from an Audio Library to layer over the one or more blocks.

Once any relevant audio, copy, and/or video blocks are selected, the system "stitches" multiple blocks together to make the ad.

To decide which blocks to try using, the system may use ad performance information it is getting back from an advertisement platform as to which blocks with which meta info are performing best. For example if a visual block showing someone getting into the rideshare application had performed well, with a high 30%+"thumb-stop" (people who stick around past a few seconds) on a previous ad, the system will be more likely to try another opening block that's similar. Same for how the platform selects copy blocks to test.

After the system produces the ad, it uploads it to an advertisement platform (e.g., Facebook or TikTok) automatically, and runs a short test to see how it performs. This data is fed back into the system, which "learns" which types of ad elements are working.

Over time, the platform gets better and better return on ad spend by trying so many diverse things, driven by the metadata, until it zeros in on what works.

Figure 2:
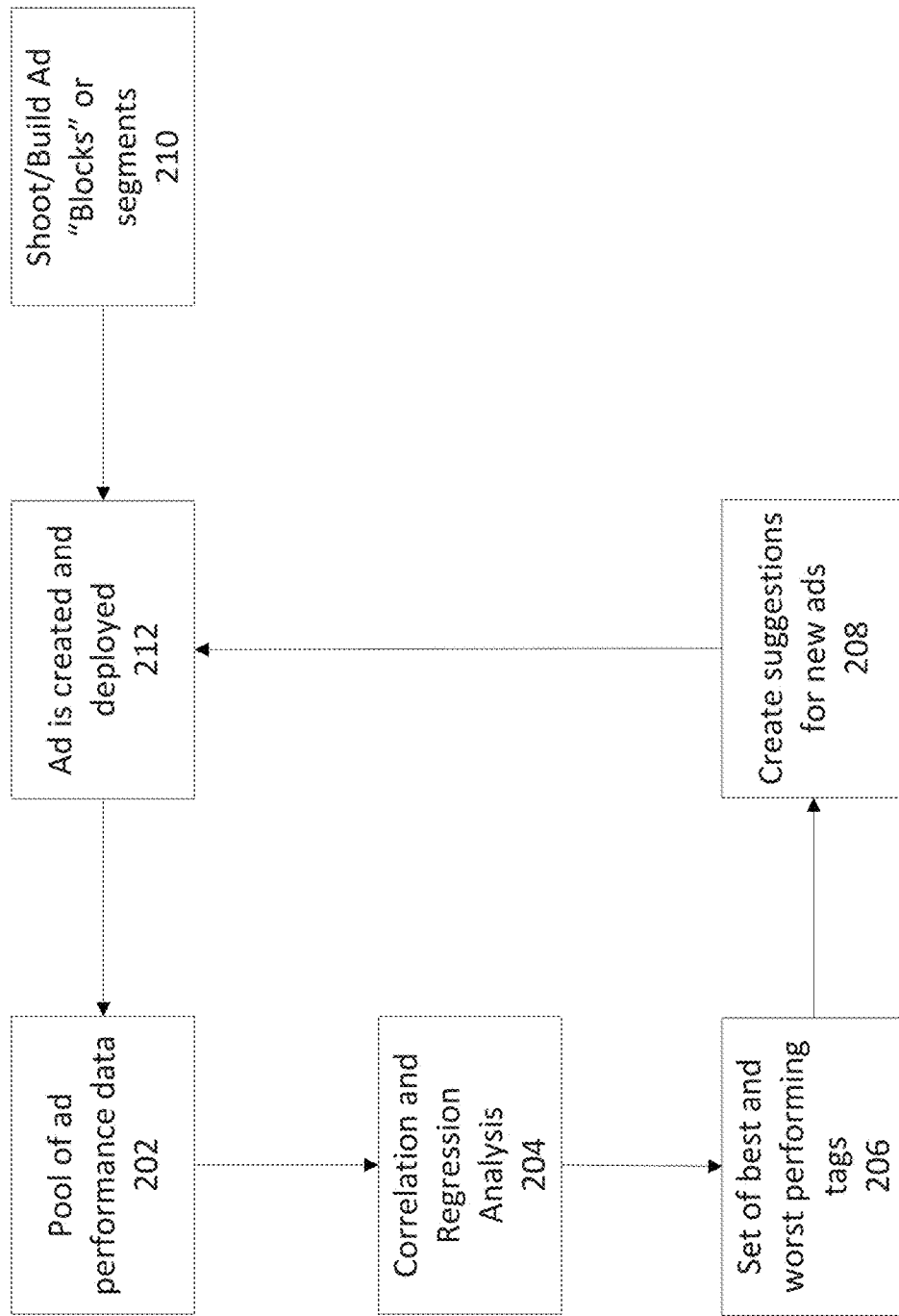
FIG. 2 is a flow diagram, according to some embodiments.

FIG. 2 is a flow diagram, according to some embodiments. At 202, a pool of ad performance data is obtained. The ad performance data may includes all tags (dominant content, power opener) as well as metrics (CPR, ROAS, etc.). In some embodiments, the ad performance data is obtained from an ad performance library, or from one or more additional internal or external data sources.

At 204, a correlation and regression analysis is run on all of the ad performance data obtained at 202.

At 206, a set of best and worst performing tags is identified based on the correlation and regression analysis.

At 208, the set of best and worse performing tags identified at 206 is used to create suggestions for new ads that should perform well.

At 210, advertisement blocks and segments are created and built. A "block" may refer to segments of footage, copy, and/or audio data that make up an advertisement or creative content.

At 212, an ad is created using the blocks and deployed into the clients' social media account or other advertisement platform, e.g., via an application programming interface (API) for testing. The blocks are automatically assembled, or stitched together, to create different ads that might perform best. After the ad has run and results come back from the advertisement platform, the ad can may be added into the existing pool of ad data. In some embodiments, the Smart Creative Feed System 101 may cap or otherwise control the amount spent on an advertising campaign.

FIGS. 3-13 are screen captures of a user interface, according to some embodiments. In some embodiments, screen captures 3-13 are generated by the smart creative feed system 101 for display on a graphical user interface (GUI) of a user terminal 103. The user interface may include a plurality of menu options, including one or more of a library, ad builder, landing page builder, and performance option, each which may include one or more GUI screens.

Figure 3:
FIG. 3 is a screen capture of a user interface, according to some embodiments.

FIG. 3 illustrates a GUI 300 depicting a footage library sub-menu option 306 under the "Libraries" menu option 302. The GUI 300 may also include a performance menu option 304, described in further detail below. The footage library may contain one or more video files, each displayed as a selectable item on the GUI, such as a selectable area showing a still from the corresponding footage as depicted in FIG. 3. Users may be able to filter through the footage library using one or more filters and/or keywords, as well as search through the footage library. The footage included in the footage library may be tagged with metadata, as described above.

In some embodiments, the "Libraries" menu 302 includes several sub-menus, including "Footage" 306, "Selects" 308, "Ads" 310, "Talent" 312, "Images" 314, "Music" 316, and "Copy" 318. Each sub-menu may correspond to libraries for different types of media assets. For example, FIG. 3 illustrates videos under the "Footage" sub-menu 306, and images may be displayed under the "Images" sub-menu 314.

Figure 4:
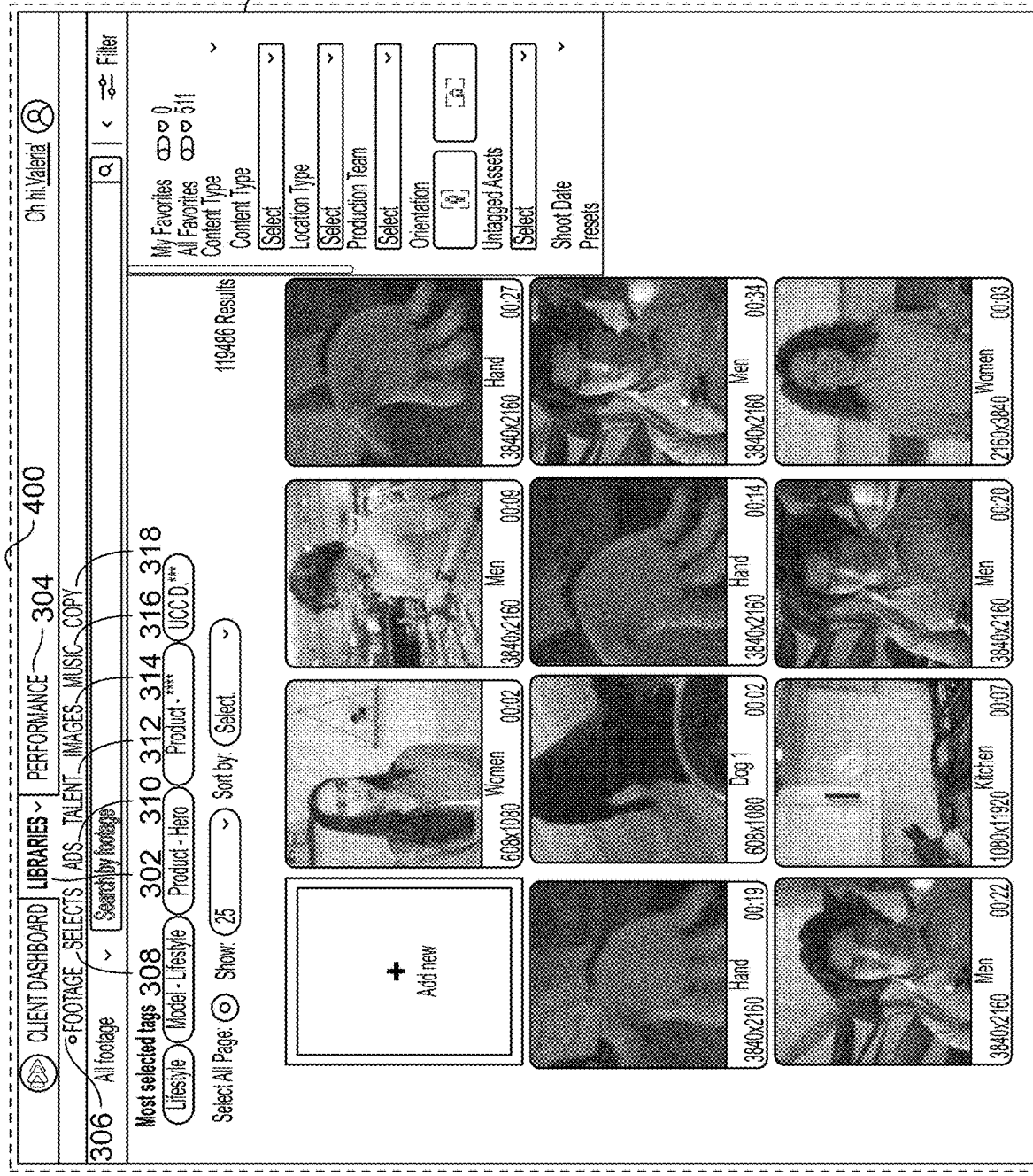
FIG. 4 is a screen capture of a user interface, according to some embodiments.

FIG. 4 illustrates a GUI 400 depicting a footage library sub-menu option 306 and filter option 420 under the "Libraries" menu option 302. As described above for FIG. 3, the GUI of FIG. 4 also shows several sub-menus, including "Footage" 306, "Selects" 308, "Ads" 310, "Talent" 312, "Images" 314, "Music" 316, and "Copy" 318. As shown in the filter menu 420, a user can filter which assets are displayed in the libraries screen based on several different criteria. These criteria include, for example, filtering based on the user's favorites, all favorites, content type, location type, production team, orientation, untagged assets, or shoot date. The user may be able to save these filter criteria as presets.

Figure 5:
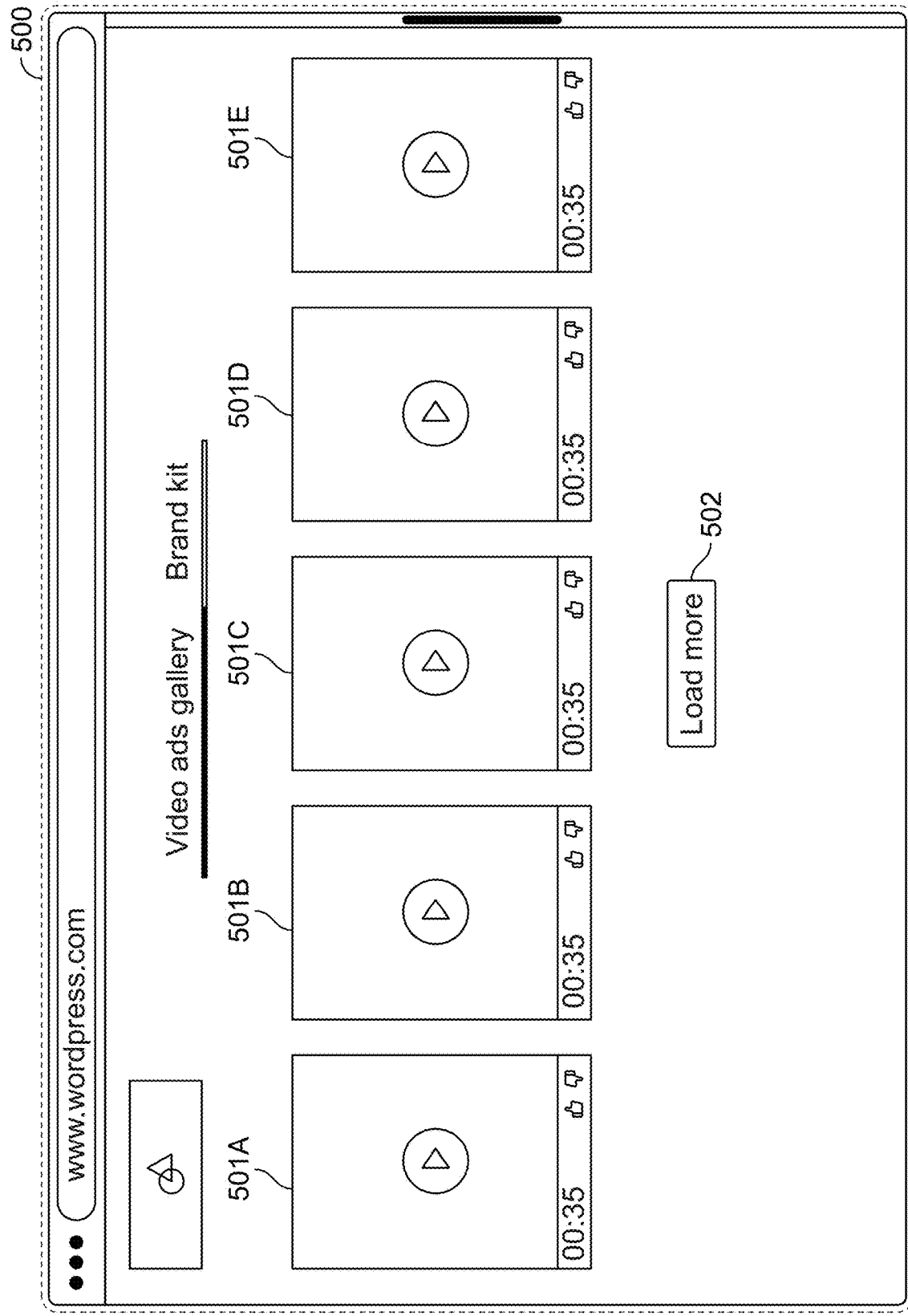
FIG. 5 is a screen capture of a user interface, according to some embodiments.

FIG. 5 illustrates a wireframe of a GUI 500 of the Library menu option. As shown in FIG. 5, the library, here of video advertisements, may display one or more assets 501A-E. A user can request that additional assets be displayed by selecting the "Load more" menu option 502.

Figure 6:
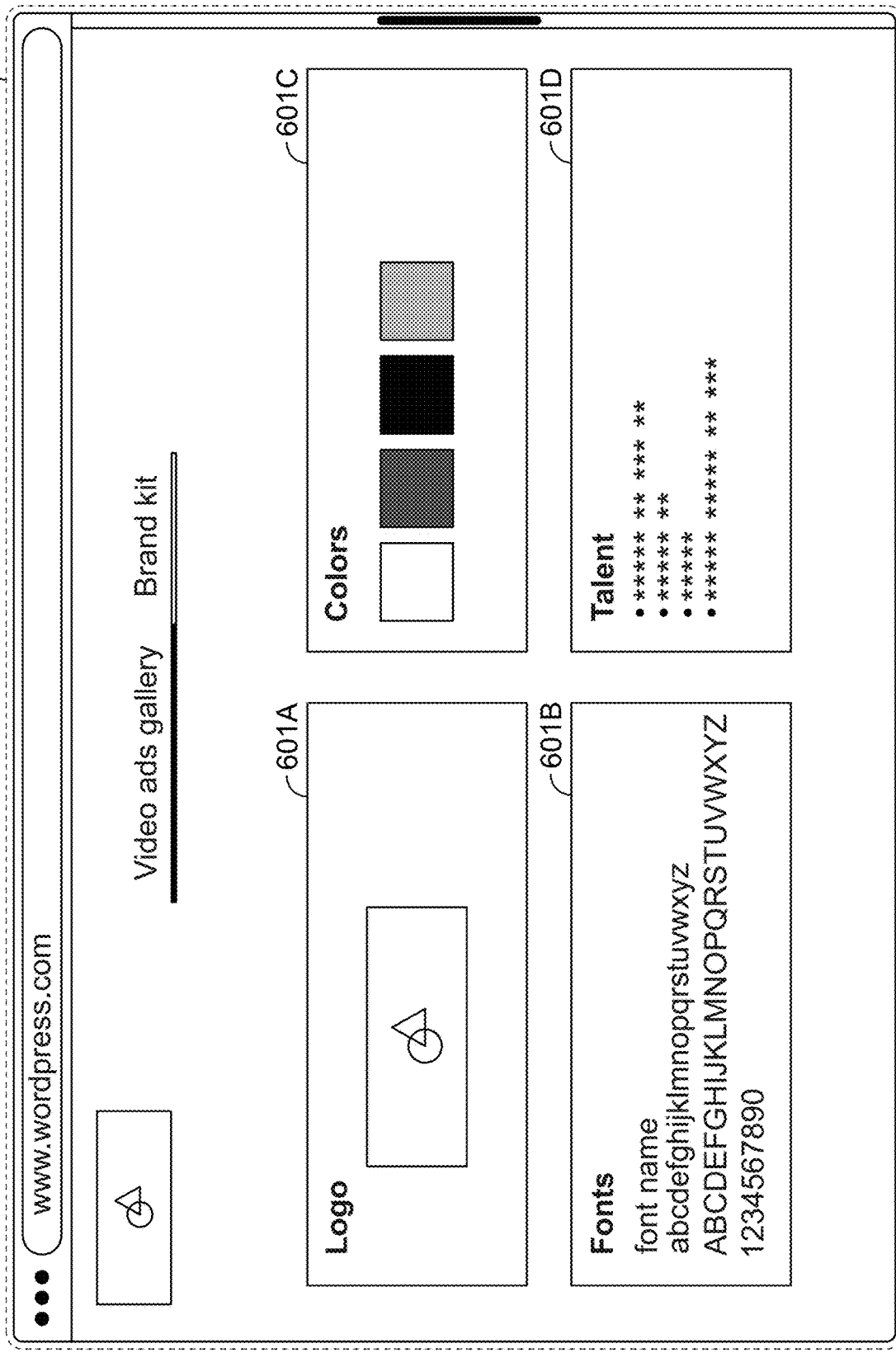
FIG. 6 is a screen capture of a user interface, according to some embodiments.

FIG. 6 illustrates a wireframe of a GUI 600 of the Brand Kit menu option. As shown in FIG. 6, one or more different attributes 601A-D for a customer and/or brand may be stored in the smart creative feed system 101. These attributes may include the customer's logo 601A, preferred fonts 601B, preferred color schemes 601C, and talent criteria 601D. In some embodiments, one or more of these attributes 601 may be used by the smart creative feed system 101 as part of the video advertisement generation process.

FIG. 7 illustrates a GUI 700 for inputting attributes 701A-F about a customer. In some embodiments, the attributes 701A-F provided in the input screen in FIG. 7 may be displayed as part of the brand kit as shown in FIG. 6. As described in connection with FIG. 6, a user may input different attributes about a customer and/or the customer's brand, which may be used by smart creative feed system 101 as part of the video advertisement generation process. The attributes may include, for example, logos 701A, fonts 701B (primary and secondary), color palettes 701C (primary background and primary text), talent details 701D (age, gender, body type, hair color, ethnicity), footage details 701D (content type, location type, production team, keywords), and specific placing and function details for footage 701F (content type, location type, production team, keywords).

FIGS. 8-11 illustrate screens under the "Performance" menu option.

FIG. 8 illustrates a GUI 800 displaying information under the performance menu 804. GUI 800 may also include a Libraries menu 802 as described above. The performance menu 804 shows one or more creatives 801A-C (one in each row), along with metadata and a number of performance metrics associated with each creative. The performance data may include, for example, 3 second video view, video average playtime, campaign budget, adset budget, spend, impressions, clicks, and so forth.

Figure 9A:
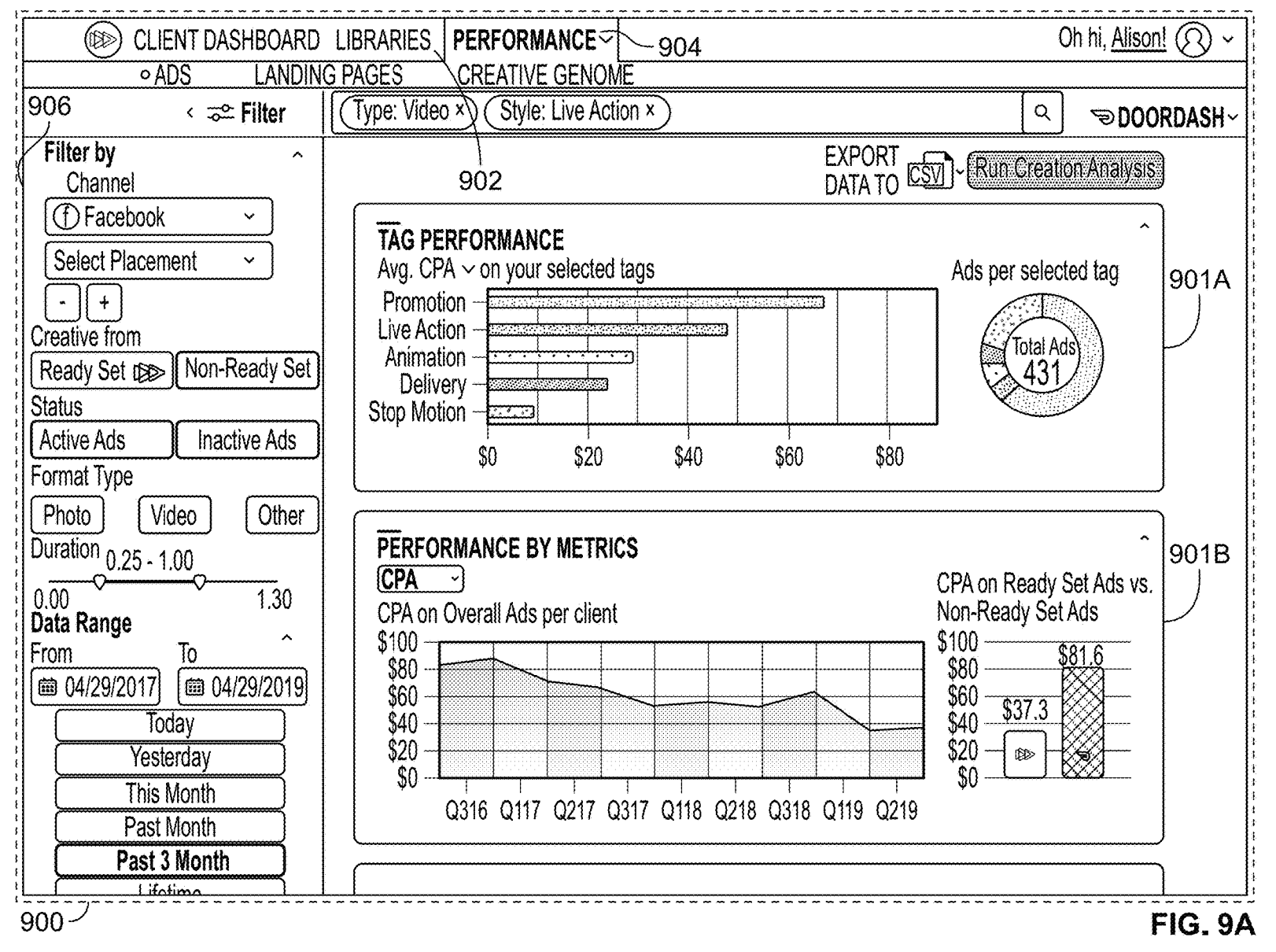

FIG. 9A illustrates a GUI 900 displaying information under the performance menu 904. GUI 900 may also include a Libraries menu 902 as described above. Performance menu 904 illustrates performance metrics of one or more tags in graphical formats. For example, the top graph 901A displays average CPA on selected tags, including promotion, live action, animation, delivery, and stop motion. For example, the bottom graph 901B displays CPA on overall ads per a client. As shown in the right side portion of graph 901B, CPA improved dramatically with use of the smart creative feed system 101, from $37.3 before use of the system and $81.6 after use of the system. The filter menu 906 allows a user to filter the performance data displayed on the GUI 900, such as by advertisement platform (Facebook or other), placement, ads generated by smart creative feed system 101 or not, status (active/inactive), format type (photo, video, other), duration, date range, among others.

FIG. 9B illustrates GUI 900 scrolled further down to display additional information under the performance menu 904. FIG. 9B illustrates further filters in the filter menu 906. Additionally, FIG. 9B illustrates potential questions and answers 908A-E regarding performance of different tags and/or creatives, as well as a chart of performance metrics and metadata associated with each creative. For example, FIG. 9A includes questions such as "How are My Tiktok ads with Fewer than 20 characters doing compared to All Tiktok ads?" in 908A. FIG. 9A further illustrates one or more assets 910A-B, such as advertisements, that a user can select in order to obtain more performance data about a specific asset.

FIG. 10 illustrates another GUI 1000 showing, under the performance menu option 1004, performance information and metadata for each attribute of a creative 1001A-K (e.g., broken out by visual styles). The attributes may include, for example, different visual styles, and an indication as to potential performance of the visual style, from good performance ("Explore"), neutral performance ("Neutral"), or negative performance ("Avoid"). GUI 1000 may also include a Libraries menu option 1002 as described above.

Figure 11:
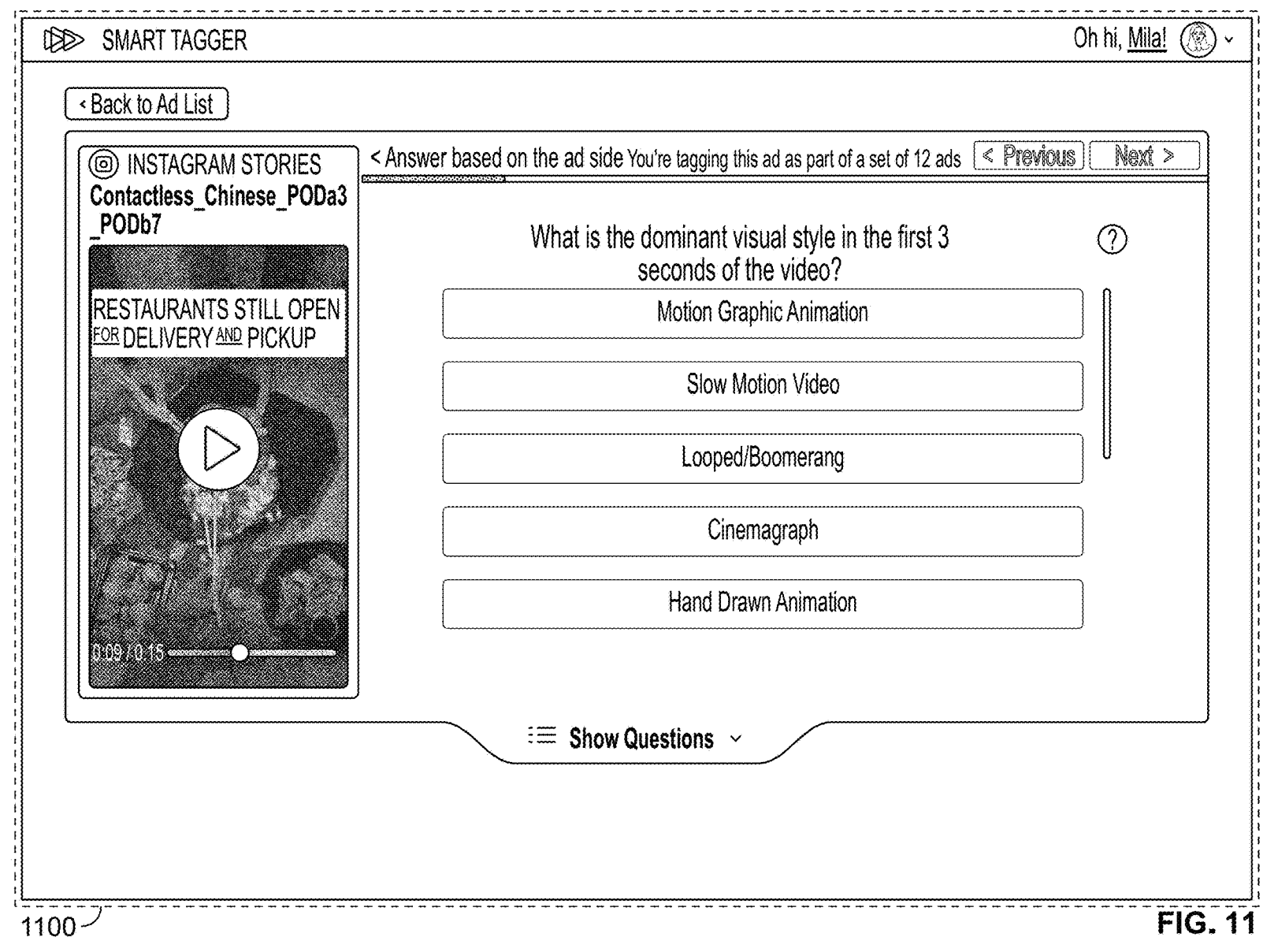
Figure 12:
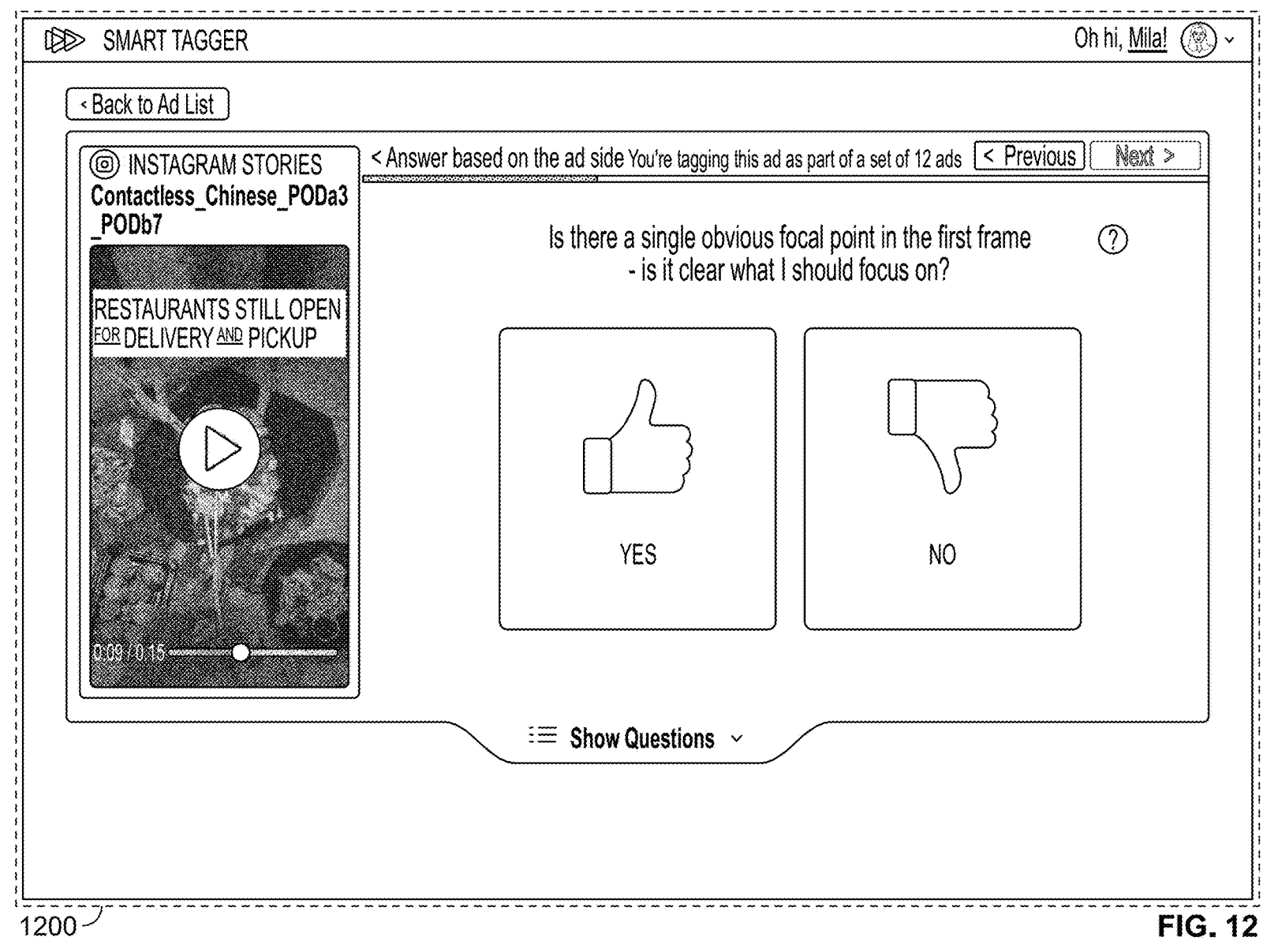

FIGS. 11-12 illustrate smart tagger GUIs 1200 and 1300, according to some embodiments. The smart tagger screens may receive manual, human input in order to associate certain tags with a specific creative or visual footage. The tags may correspond to visual style in the ad (FIG. 11), or a focal point (FIG. 12), for example.

In some embodiments, a frontend user interface is provided that allows a customer to specify one or more attributes the recommendation engine should use to select assets. FIGS. 13-14 illustrate a screen captures of a frontend user interface, according to some embodiments.

As shown in FIG. 13, a user may select an advertisement associated with one or more attributes, and request that the smart creative feed system 101 generate video advertisements that are similar to the selected advertisement. FIG. 13 illustrates a GUI 1300 showing a selected video advertisement named "Ronnie_Unoboxing.mov," which is associated with one or more attributes. FIG. 13 further illustrates several attributes associated with the advertisement including brand, content type, location type, production team, actors/talent, custom tags, keywords, format, and quality. These attributes may be used by smart creative feed system 101 to generate video advertisements.

In some embodiments, as shown in GUI 1400 of FIG. 14, a user may select one or more attributes (e.g., footage details, talent details) using one or more interactive user interface elements, such as dropdown menus, instead of or in addition to selecting an asset as shown in FIG. 13. A user then may select an interface user interface element 1402, e.g., a button, to instruct the smart creative feed system 101 to generate a video advertisement using the identified attributes.

In some embodiments, the attributes shown in FIGS. 13-14 may correspond to keywords, tags, and talent as described above.

FIGS. 15A-D illustrates example similarity scores, according to some embodiments. In response to receiving one or more attributes (e.g., the attributes shown in FIGS. 13-14), a recommendation engine in smart creative feed system 101 may select one or more assets from the asset libraries 105A-N based on the one or more attributes. In some embodiments, the selection process includes calculating one or more similarity scores reflecting how similar an asset in asset library 105 is to the inputted attribute.

Figure 15C:

FIG. 15A illustrates selection of six assets based on a total similarity score (score="23") based on a keyword score (kwscore: "5"), talent score (tscore: "5"), and tag score (tscore:"13"). The total similarity score may be based on a composite of a keyword similarity score, tag similarity score, and/or talent similarity score, shown in FIGS. 15B-D.

FIG. 15B illustrates calculation of a similarity score based on keyword matches. In this example, smart creative feed system 101 has selected six assets that have keywords that match the keywords "apparel," "clothing," "face," "human" and "person."

FIG. 15C illustrates calculation of a similarity score based on tag matches. In this example, smart creative feed system 101 has selected six assets that have tags that match several lifestyle, product, and other tags.

Figure 15D:
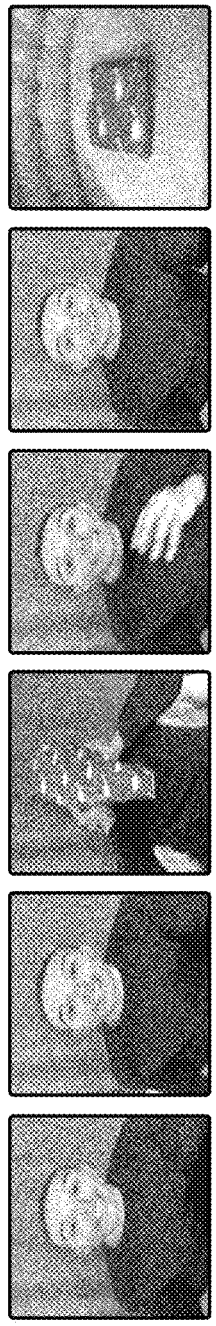

FIG. 15D illustrates calculation of a similarity score based on talent matches. In this example, smart creative feed system 101 has selected six assets that have talent tags that match several talent tags, such as age, etc.

As shown in FIGS. 15A-D, different assets may be selected from the asset libraries 105A-N based on keyword, tag, and talent tag matches. Accordingly, in some embodiments, the total composite similarity score may be based on weighting the different similarities scores evenly or differently in order to arrive at the best matches.

Figure 16:
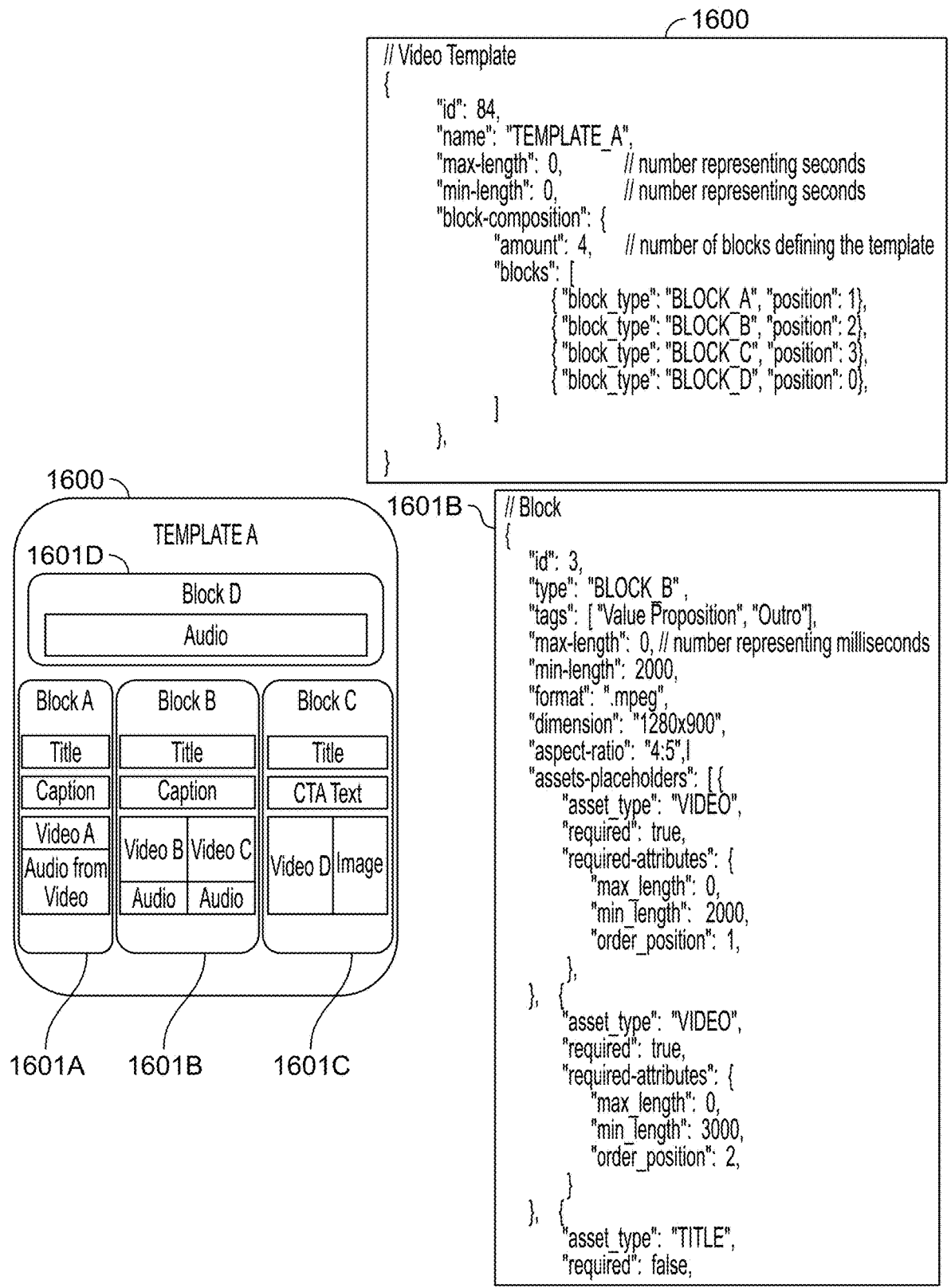
FIG. 16 is a template, according to some embodiments.

FIG. 16 illustrates a template, according to some embodiments. FIG. 16 illustrates a template 1600 ("Template A") as a logical block diagram, as well as programically. Each template 1600 may include one or more blocks (e.g., blocks 1601A-D), and each block may include one or more assets, such as audio, copy (title, caption), video, and images. The example template in FIG. 16 has four blocks, which make up constituent components of a video advertisement. According to some embodiments, the template 1600 represents a "formula" for generating a video advertisement, where each block corresponds to the different components of the video advertisement. In some embodiments, each block may be temporally ordered, and certain blocks may corresponds to an intro or outro of the advertisement. For example, the detailed view of block B 1601B shows that Block B 1601B is an outro, which should have a minimum length of 200 ms.

According to some embodiments, the assets indicated in each block 1601A-D of template 1600 are placeholders. In some embodiments, the smart creative feed system 101, in response to receiving one or more attributes from a user (e.g., as described above in connection with FIGS. 13-14), will obtain a template (such as template A, 1600), and select one or more assets from asset libraries 105A-N to fill in the one or more asset placeholders in blocks 1601A-D. In some embodiments, the selection of one or more assets from asset libraries 105A-N is performed based on the asset type indicated in the block of the template (e.g., audio, video, text, image) and on one or more similarity scores as described above.

Once smart creative feed system 101 selects the appropriate asset(s), the template is updated to include the selected assets in the placeholders in the template and/or in one or more video calls. Table 1 below illustrates an example of video calls in the template after assets are selected. In Table 1, the template is updated to include a location of a first video asset, content for a first copy ("I can't believe I lived my life with an itchy scalp"), a location of a second video asset, content for a second copy ("More flavor and crunchier skin"), a location of a first audio asset, a location of a second video asset, and a video request identifier. The template, with the media asset callouts and video request, is processed by the render engine 109 to generate a video advertisement based on the template.

TABLE 1

Example Template Provided to Render Engine

```
{
  "name": "pet-9x16",
  "resolution": {
    "width": 1080,
    "height": 1920
  },
```

TABLE 1-continued

Example Template Provided to Render Engine

```
  },
  "aspect_ratio": "9:16",
  "output_format": [
    "h264"
  ],
  "max_length": 20,
  "min_length": 5,
  "blocks": [
    {
      "id": 10,
      "type": "VIDEO",
      "placing": "Opener",
      "function": "Insight",
      "min_length": null,
      "max_length": null,
      "tags": [ ],
      "assets": [
        {
          "slot": 1,
          "tags": [ ],
          "keywords": [
            "chihuahua",
            "animal",
            "pet"
          ],
          "type": "VIDEO",
          "main_content": true,
          "required": true,
          "attributes": {
            "audio": false,
            "min_length": 2,
            "max_length": 7
          },
          "content": {
            "url": "https://LocationofFirstVideoAsset.MOV"
          },
          "layer": 1,
          "sequence_order": 1
        },
        {
          "slot": 2,
          "tags": [ ],
          "keywords": [ ],
          "type": "SHAPE",
          "main_content": false,
          "required": true,
          "attributes": {
            "width": "100%",
            "height": "20%",
            "color": "#666666",
            "h-align": "CENTER",
            "v-align": "TOP"
          },
          "content": {
            "width": "100%",
            "height": "20%",
            "color": "#666666",
            "h-align": "CENTER",
            "v-align": "TOP"
          },
          "layer": 2,
          "sequence_order": 1
        },
        {
          "slot": 3,
          "tags": [ ],
          "keywords": [
            "Benefit",
            "Insight",
            "insight"
          ],
          "type": "TEXT",
          "main_content": false,
          "required": true,
          "attributes": {
            "font-file": "gainful-sans.ttf",
            "color": "#000000",
            "h-align": "CENTER",
```

TABLE 1-continued

Example Template Provided to Render Engine

```
          "v-align": "TOP"
        },
        "content": {
          "copy": "I can't believe I lived my life with an itchy scalp"
        },
        "layer": 3,
        "sequence_order": 1
      }
    ]
  },
  {
    "id": 20,
    "type": "VIDEO",
    "placing": "Body",
    "function": "Benefit",
    "min_length": null,
    "max_length": null,
    "tags": [ ],
    "assets": [
      {
        "slot": 1,
        "tags": [ ],
        "keywords": [
          "chihuahua",
          "animal",
          "pet"
        ],
        "type": "VIDEO",
        "main_content": true,
        "required": true,
        "attributes": {
          "audio": false,
          "min_length": 2,
          "max_length": 7
        },
        "content": {
          "url": " LocationofSecondVideoAsset.mov"
        },
        "layer": 1,
        "sequence_order": 1
      },
      {
        "slot": 2,
        "tags": [ ],
        "keywords": [ ],
        "type": "SHAPE",
        "main_content": false,
        "required": true,
        "attributes": {
          "width": "100%",
          "height": "20%",
          "color": "#666666",
          "h-align": "CENTER",
          "v-align": "TOP"
        },
        "content": { },
        "layer": 2,
        "sequence_order": 1
      },
      {
        "slot": 3,
        "tags": [ ],
        "keywords": [
          "Benefit",
          "Insight",
          "benefit"
        ],
        "type": "TEXT",
        "main_content": false,
        "required": true,
        "attributes": {
          "font-file": "gainful-sans.ttf",
          "color": "#000000",
          "h-align": "CENTER",
          "v-align": "TOP"
        },
        "content": {
          "copy": "More flavor and crunchier skin"
```

TABLE 1-continued

Example Template Provided to Render Engine

```
        },
        "layer": 3,
        "sequence_order": 1
      }
    ]
  },
  {
    "id": 30,
    "type": "VIDEO",
    "placing": "Outro",
    "function": "Other",
    "min_length": null,
    "max_length": null,
    "tags": [ ],
    "assets": [
      {
        "slot": 1,
        "tags": [ ],
        "keywords": [ ],
        "type": "VIDEO",
        "main_content": true,
        "required": true,
        "attributes": {
          "audio": false,
          "min_length": 2,
          "max_length": 7
        },
        "content": {
          "url": "https://LocationofFirstAudioAsset.mp4"
        },
        "layer": 1,
        "sequence_order": 1
      }
    ]
  },
  {
    "id": 40,
    "type": "MUSIC_TRACK",
    "placing": "All",
    "function": "Other",
    "min_length": null,
    "max_length": null,
    "tags": [ ],
    "assets": [
      {
        "slot": 1,
        "tags": [ ],
        "keywords": [ ],
        "type": "AUDIO",
        "main_content": false,
        "required": true,
        "attributes": {
          "volume": null,
          "fade_in": false,
          "fade_out": true
        },
        "content": {
          "url": "https://LocationofSecondAudioAsset.mp3"
        },
        "layer": 1,
        "sequence_order": 1
      }
    ]
  }
],
"video_request_id": "62264bd5555299b4ea8d71a1"
}
```

In some embodiments, the templates are used to trigger video rendering requests. Video requests use the recommendation engine in smart creative feed system 101 to fit the best matches (e.g., based on similarity scores) into the asset placeholders in the template. Then a new video request message is added to the processing queue for the render engine 109. In some embodiments, the render engine 109 will invoke a combination of video handling libraries, such as FFMPEG, Puppeteer, and others to manipulate the length, size, aspect ratio, resolution, etc. of the selected assets and combine them into a new video. Once the video is processed and rendered, the video will be output (e.g., as an MPEG file or other video file format). In some embodiments, by backfeeding the accuracy of the video ad generation process, machine learning may be used to improve the asset selection within the recommendation engine of smart creative feed system 101. In addition, advertisement platform 107 analytics will also improve the assets selection process based on performance reports.

In some embodiments, once the video advertisement is generated, the video advertisement is automatically launched on advertisement platform 107. One or more selected assets may be removed, modified (e.g., change in position or temporal ordering), or new assets may be added to the video advertisement based on the performance analytics obtained from advertisement platform 107.

Figure 17:
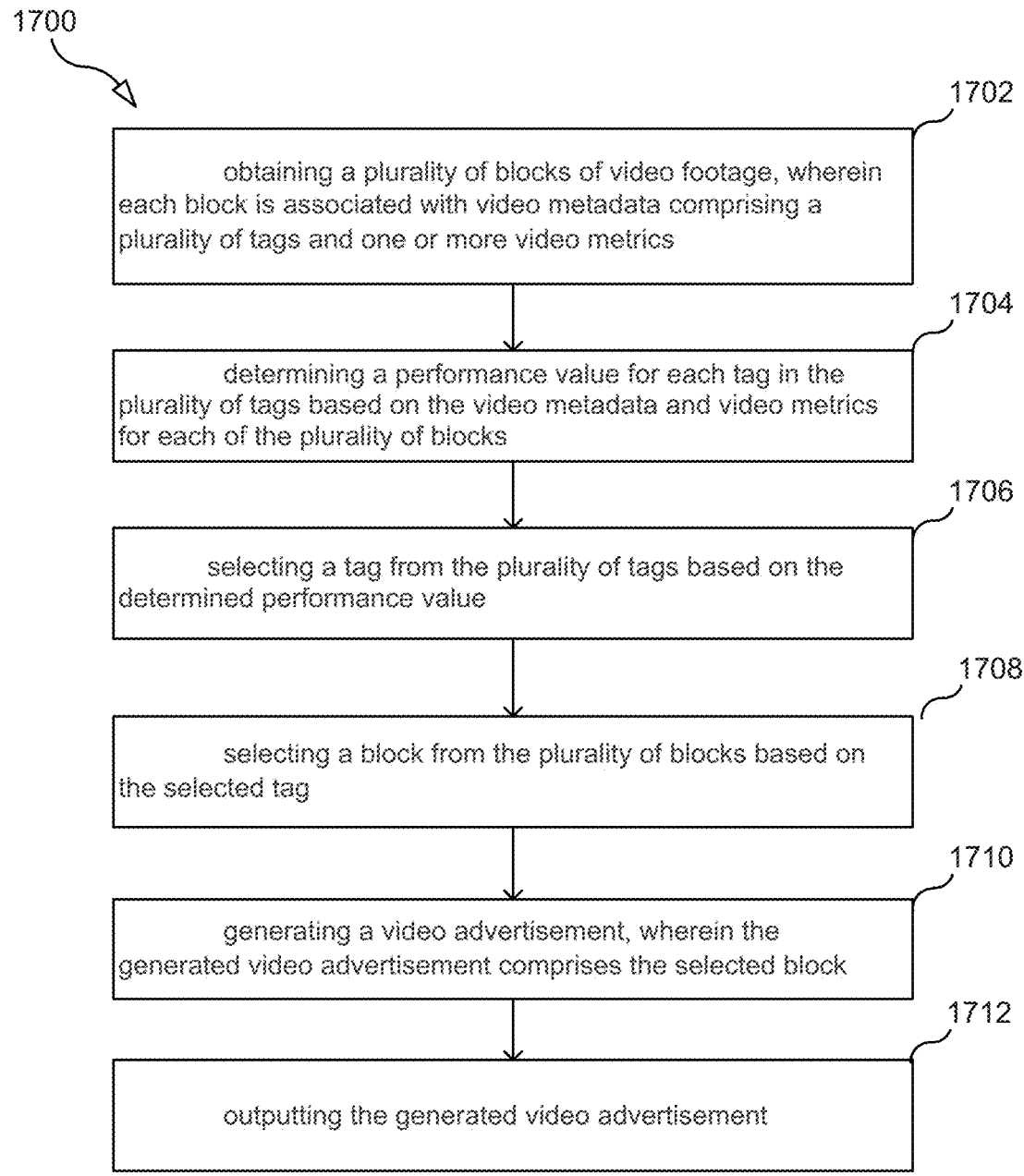
FIG. 17 is a method, according to some embodiments.

FIG. 17 is a method, according to some embodiments. Method 1700 may be performed by smart creative feed system 101 for automatically generating video advertisements. At step 1702, a plurality of blocks of video footage is obtained, wherein each block is associated with video metadata comprising a plurality of tags and one or more video metrics. At step 1704, a performance value is determined for each tag in the plurality of tags based on the video metadata and video metrics for each of the plurality of blocks. At step 1706, a tag is selected from the plurality of tags based on the determined performance value. At step 1708, a block from the plurality of blocks is selected based on the selected tag. At step 1710, a video advertisement is generated, wherein the generated video advertisement comprises the selected block. At step 1712, the generated video advertisement is outputted.

Figure 18:
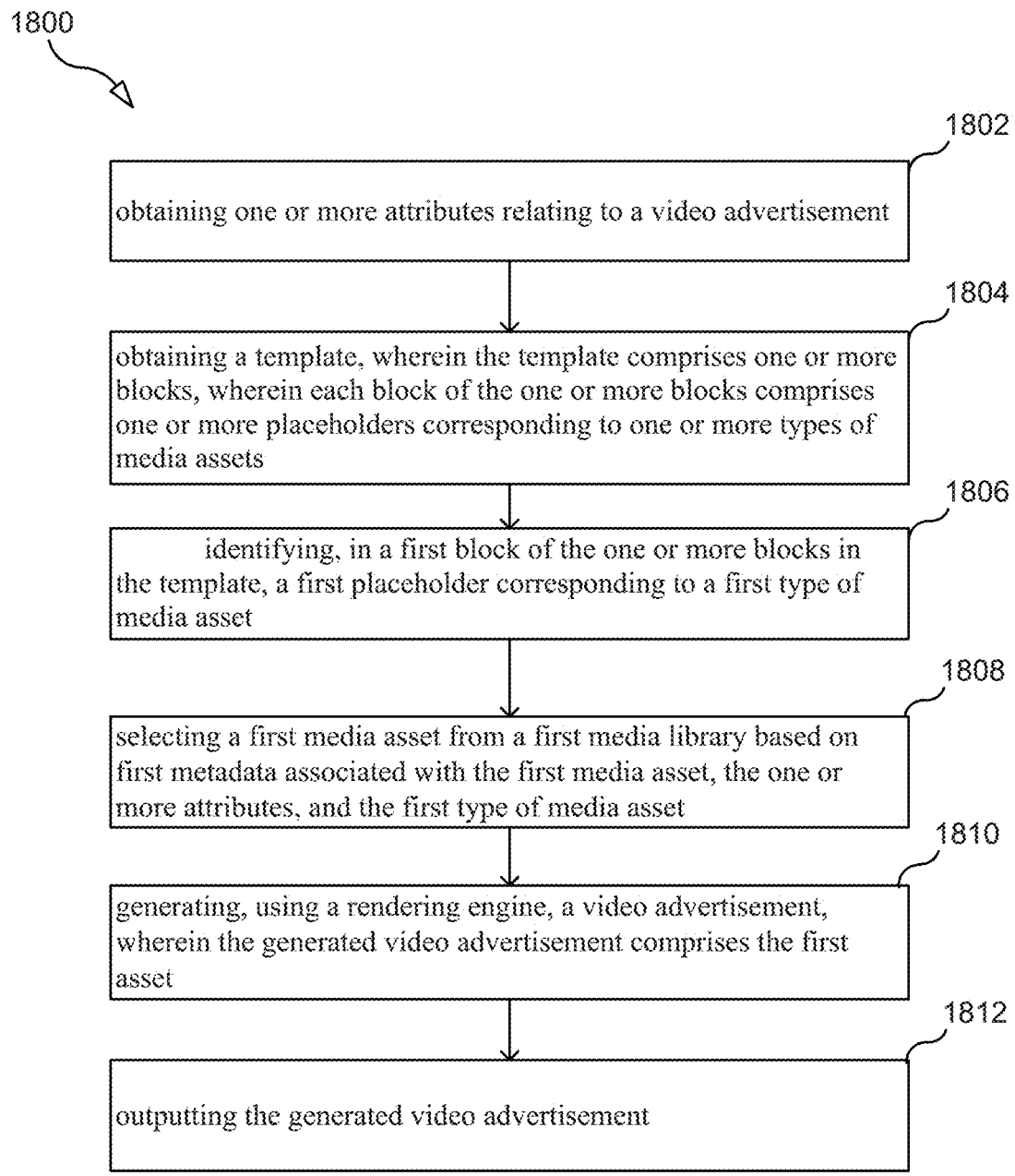
FIG. 18 is a method, according to some embodiments.

FIG. 18 is a method, according to some embodiments. Method 1800 may be performed by smart creative feed system 101 for automatically generating a video advertisement.

Step 1802 of the method includes obtaining one or more attributes relating to a video advertisement. In some embodiments, the one or more attributes may be obtained as described above in connection with FIGS. 13 and 14.

Step 1804 of the method includes obtaining a template, wherein the template comprises one or more blocks, wherein each block of the one or more blocks comprises one or more placeholders corresponding to one or more types of media assets. In some embodiments, the template is the example template 1600 as described above in connection with FIG. 16.

Step 1806 of the method includes identifying, in a first block of the one or more blocks in the template, a first placeholder corresponding to a first type of media asset.

Step 1808 of the method includes selecting a first media asset from a first media library based on first metadata associated with the first media asset, the one or more attributes, and the first type of media asset.

Step 1808 of the method includes generating, using a rendering engine, a video advertisement, wherein the generated video advertisement comprises the first asset.

Step 1812 of the method includes outputting the generated video advertisement.

Figure 19:
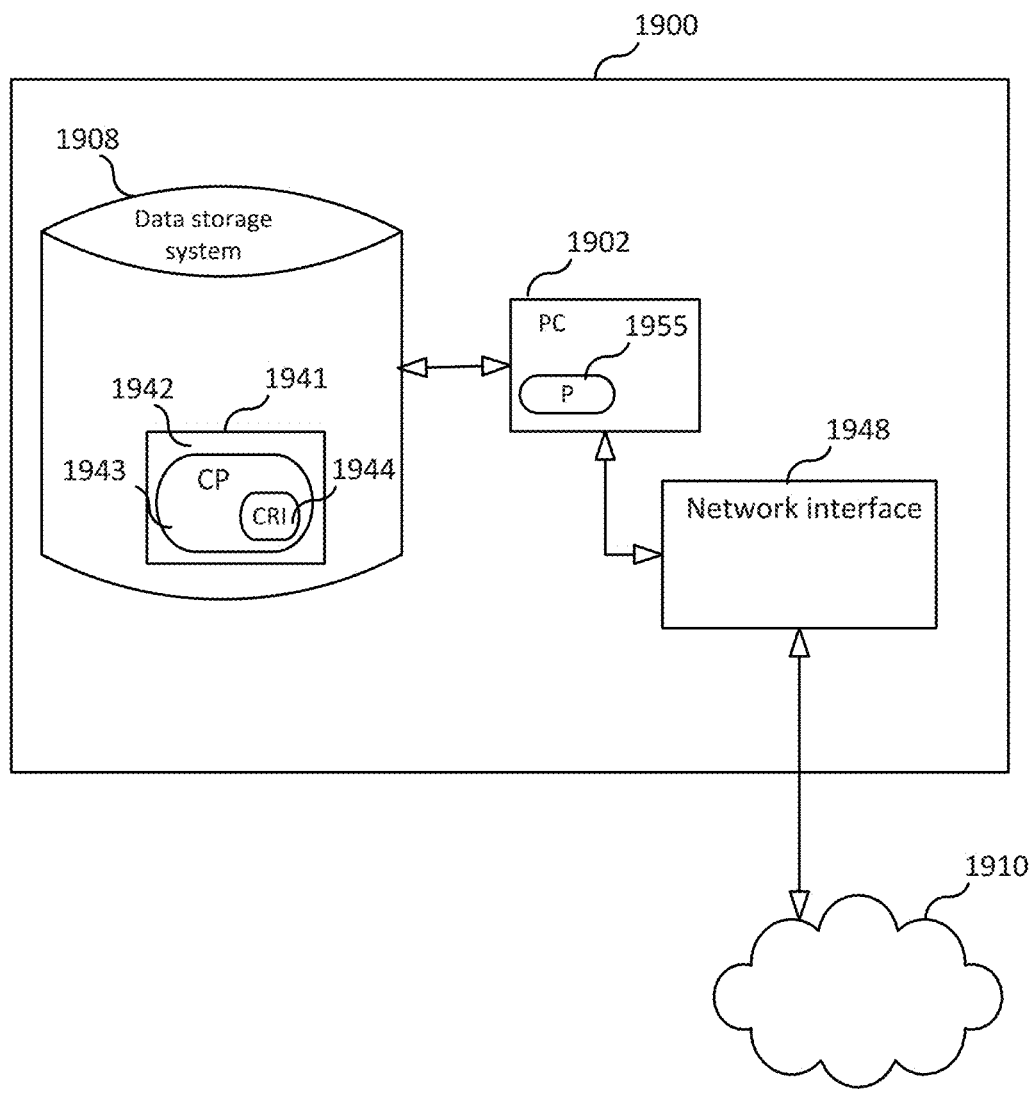
FIG. 19 is a block diagram illustrating an apparatus, according to some embodiments.

FIG. 19 is a block diagram of an apparatus 1900 (e.g., smart creative feed system 101), according to some embodiments. As shown in FIG. 19, the apparatus may comprise: processing circuitry (PC) 1902, which may include one or more processors (P) 1955 (e.g., a general purpose microprocessor and/or one or more other processors, such as an application specific integrated circuit (ASIC), field-programmable gate arrays (FPGAs), and the like); a network interface 1948 for enabling the apparatus to transmit data to and receive data from other devices connected to a network 1910 (e.g., an Internet Protocol (IP) network such as the Internet) to which network interface 1948 is connected; and a local storage unit (a.k.a., "data storage system") 1908, which may include one or more non-volatile storage devices and/or one or more volatile storage devices. In embodiments where PC 1902 includes a programmable processor, a computer program product (CPP) 1941 may be provided. CPP 1941 includes a computer readable medium (CRM) 1942 storing a computer program (CP) 1943 comprising computer readable instructions (CRI) 1944. CRM 1942 may be a non-transitory computer readable medium, such as, magnetic media (e.g., a hard disk), optical media, memory devices (e.g., random access memory, flash memory), and the like. In some embodiments, the CRI 1944 of computer program 1943 is configured such that when executed by PC 1902, the CRI causes the apparatus to perform steps described herein (e.g., steps described herein with reference to the flow charts). In other embodiments, the apparatus may be configured to perform steps described herein without the need for code. That is, for example, PC 1902 may consist merely of one or more ASICs. Hence, the features of the embodiments described herein may be implemented in hardware and/or software.

Embodiments

1. A method for automatically generating video advertisements, the method comprising:
obtaining a plurality of blocks of video footage, wherein each block is associated with video metadata comprising a plurality of tags and one or more video metrics;
determining a performance value for each tag in the plurality of tags based on the video metadata and video metrics for each of the plurality of blocks;
selecting a tag from the plurality of tags based on the determined performance value; selecting a block from the plurality of blocks based on the selected tag;
generating a video advertisement, wherein the generated video advertisement comprises the selected block;
testing the generated video advertisement on an advertisement platform; and, modifying the generated video advertisement based on the testing.

2. The method of embodiment 1, wherein the determining a performance value for each tag in the plurality of tags comprises:
performing a correlation and regression analysis on the video metadata and video metrics for each of the plurality of blocks.

3. The method of embodiment 1, wherein the advertisement platform comprises a social media account, wherein the testing the generated video advertisement on the advertisement platform comprises:
submitting the generated video advertisement to the advertisement platform through an application programming interface (API); and
obtaining performance information from the advertisement platform from the API.

4. The method of embodiment 1, wherein the generating the video advertisement further comprises:
obtaining, from a copy library, a plurality of advertisement texts, wherein each advertisement text is associated with copy metadata comprising one or more copy metrics; and selecting an advertisement text from the plurality of advertisement texts based on the copy metrics;
superimposing the selected advertisement text on the generated video advertisement.

5. The method of embodiment 1, wherein the generating the video advertisement further comprises:
obtaining, from an audio library, a plurality of audio files, wherein each audio file is associated with audio metadata;
selecting an audio file from the plurality of audio files based on the audio metadata;
combining the selected audio file with the generated video advertisement.

6. The method of embodiment 4 or 5, wherein the modifying the video advertisement based on the testing comprises removing at least one of: the selected block, the selected advertisement text, or the selected audio file from the generated video advertisement.

7. The method of embodiment 1, further comprising:
testing the modified video advertisement on the advertisement platform.

8. The method of embodiment 1, wherein the metadata for a block of video footage comprises a plurality of tags relating to content displayed in the block of video footage.

9. The method of embodiment 1, wherein the testing the generated video advertisement comprises:
submitting the generated video advertisement to the advertisement platform for launch on the advertisement platform; and
receiving performance data for the generated video advertisement from the advertisement platform.

10. The method of embodiment 9, further comprising:
creating a report for the generated video advertisement based on the received performance data; and
displaying the report on a graphical user interface of a client device.

11. The method of embodiment 1, wherein generating the video advertisement further comprises:
stitching the selected block with one or more additional blocks different than the selected block from the plurality of blocks.

12. A system comprising:
a processor; and
a non-transitory computer-readable medium coupled to the processor, wherein the processor is configured to perform any one of the methods recited in embodiments 1-12.

While various embodiments of the present disclosure are described herein, it should be understood that they have been presented by way of example only, and not limitation. Thus, the breadth and scope of the present disclosure should not be limited by any of the above-described embodiments. Generally, all terms used herein are to be interpreted according to their ordinary meaning in the relevant technical field, unless a different meaning is clearly given and/or is implied from the context in which it is used. All references to a/an/the article, element, apparatus, component, layer, means, step, etc. are to be interpreted openly as referring to at least one instance of the article, element, apparatus, component, layer, means, step, etc., unless explicitly stated otherwise. Any combination of the above-described elements in all possible variations thereof is encompassed by the disclosure unless otherwise indicated herein or otherwise clearly contradicted by context.

The invention claimed is:

1. A computer-implemented method for automatically generating a video advertisement, the method comprising:
obtaining one or more attributes relating to a video advertisement;
obtaining a first set of one or more performance metrics associated with the one or more attributes;
obtaining a template, wherein the template comprises a plurality of blocks, wherein each block of the plurality of blocks corresponds to a temporal segment of video data for a video advertisement and comprises
a block identifier,
a block type,
one or more tags,
one or more video format attributes comprising at least one of a maximum length, a minimum length, a format type, a dimension, or an aspect-ratio, and
one or more placeholders corresponding to one or more types of media assets;
identifying, in a first block of the plurality of blocks in the template, a first placeholder corresponding to a first type of media asset, wherein the first block corresponds to a first temporal position;
selecting a first media asset from a first media library based on first metadata associated with the first media asset, the one or more attributes, the one or more tags for the first block, the first type of media asset, and the first set of one or more performance metrics;
identifying, in a second block of the plurality of blocks in the template, a second placeholder corresponding to a second type of media asset, wherein the second block corresponds to a second temporal position different than the first temporal position;
selecting a second media asset from a second media library based on second metadata associated with the second media asset, the one or more attributes, the one or more tags for the second block, the second type of media asset, and the first set of one or more performance metrics;
generating, using a rendering engine, a first segment of video data comprising the first asset in accordance with the one or more video format attributes of the first block, wherein the first segment of video data corresponds to the first temporal position;
generating, using the rendering engine, a second segment of video data comprising the second asset in accordance with the one or more video format attributes of the second block, wherein the second segment of video data corresponds to the second temporal position;
stitching the first segment of video data comprising the first asset and the second segment of video data comprising the second asset together into a video file comprising a video advertisement in accordance with the first temporal position and second temporal position;
outputting the generated video advertisement to an advertisement platform;
obtaining, from the advertisement platform, a second set of one or more performance metrics for the first media asset and the second media asset; and
outputting, to a graphical user interface, the second set of one or more performance metrics.

2. The method of claim 1 wherein the one or more types of media assets comprise one or more of video, audio, image, or text.

3. The method of claim 1, further comprising:
identifying in the first block a second placeholder corresponding to a second type of media asset; and
selecting a second media asset from a second media library based on second metadata associated with the second media asset, the one or more attributes, the one or more tags for the first block, and the second type of media asset, wherein the generating the first segment of video data comprises generating the first segment of video data comprising the first asset and the second asset.

4. The method of claim 3, wherein the first type of media asset is different than the second type of media asset.

5. The method of claim 1, further comprising:
obtaining one or more testing metrics for the generated video advertisement; and
modifying the generated video advertisement based on the one or more testing metrics.

6. The method of claim 5, wherein the modifying comprises generating, using the rendering engine, a second video advertisement, wherein the second video advertisement comprises at least one of:
a second media asset different than the first media asset,
a temporal ordering of the first segment of video data and the second segment of data different than an original temporal ordering of the first segment of video data and the second segment of video data in the generated video advertisement,
a combination of the first media asset and the second media asset different than an original combination of the first media asset and the second media asset in the generated video advertisement, or
a placement of the first media asset different than an original placement of the first media asset in the first generated video advertisement.

7. The method of claim 1, wherein the obtaining one or more attributes relating to a video advertisement comprises:
obtaining video footage associated with a first user;
breaking the video footage into a plurality of blocks of video footage, wherein each block comprises one or more media assets; and
generating, for each media asset of the one or more media assets, metadata comprising the one or more attributes.

8. The method of claim 7, wherein the generating comprises using a machine learning model to identify the one or more attributes.

9. The method of claim 1, wherein the selecting the first media asset comprises:
determining that the first media asset has a type that is the same as the first type of media asset.

10. The method of claim 1, wherein the selecting the first media asset comprises:
calculating a similarity score between the obtained one or more attributes and one or more attributes in the first metadata.

11. The method of claim 10, wherein the calculating the similarity score comprises:
calculating a first similarity score between the obtained one or more attributes and the one or more attributes in the first metadata based on a first criteria;
calculating a second similarity score between the obtained one or more attributes and the one or more attributes in the first metadata based on a second criteria; and
combining the first similarity score and the second similarity score.

12. The method of claim 1, further comprising:
updating the first placeholder with information identifying a storage location of the first media asset in the first media asset library and positioning information of the first media asset for inclusion in the generated first segment of video data; and
submitting the template with the updated first placeholder to the rendering engine.

13. The method of claim 12, wherein the positioning information comprises a sequence order of the first media asset in the generated first segment of video data.

14. The method of claim 1, wherein the rendering engine modifies at least one of a length, size, aspect ratio, or resolution of the first asset for inclusion in the video file.

15. The method of claim 1, wherein the one or more performance metrics in the first set or the second set comprise at least one of three second video view or video average play time.

16. The method of claim 1, wherein the one or more attributes relating to the video advertisement comprise one or more keywords describing content of a media asset, tags comprising information about a production of a media asset, or talent tags comprising information about people contained in a media asset.

17. The method of claim 1, wherein the graphical user interface displays the second set of one or more performance metrics as an answer to a question regarding a performance of the first media asset or the second media asset.

18. The method of claim 1, wherein the graphical user interface displays the one or more performance metrics as an indication of a good, neutral, or negative performance of the first media asset or the second media asset.

19. A system comprising:
one or more processors; and
a non-transitory computer-readable medium coupled to the one or more processors, wherein the processor is configured to:
obtain one or more attributes relating to a video advertisement;
obtain a first set of one or more performance metrics associated with the one or more attributes;
obtain a template, wherein the template comprises a plurality of blocks, wherein each block of the plurality of blocks corresponds to a temporal segment of video data for a video advertisement and comprises
a block identifier,
a block type,
one or more tags,
one or more video format attributes comprising at least one of a maximum length, a minimum length, a format type, a dimension, or an aspect-ratio, and
one or more placeholders corresponding to one or more types of media assets;
identify, in a first block of the plurality of blocks in the template, a first placeholder corresponding to a first type of media asset, wherein the first block corresponds to a first temporal position;
select a first media asset from a first media library based on first metadata associated with the first media asset, the one or more attributes, the one or more tags for the first block, the first type of media asset, and the first set of one or more performance metrics;
identify, in a second block of the plurality of blocks in the template, a second placeholder corresponding to a second type of media asset, wherein the second block corresponds to a second temporal position different than the first temporal position;
select a second media asset from a second media library based on second metadata associated with the second media asset, the one or more attributes, the one or more tags for the second block, the second type of media asset, and the first set of one or more performance metrics;

generate, using a rendering engine, a first segment of
video data comprising the first asset in accordance with
the one or more video format attributes of the first
block, wherein the first segment of video data corresponds to the first temporal position;
generate, using the rendering engine, a second segment of
video data comprising the second asset in accordance
with the one or more video format attributes of the
second block, wherein the second segment of video
data corresponds to the second temporal position;
stitch the first segment of video data comprising the first
asset and the second segment of video data comprising
the second asset together into a video file comprising a
video advertisement in accordance with the first temporal position and the second temporal position;
output the generated video advertisement to an advertisement platform;
obtain, from the advertisement platform, a second set of
one or more performance metrics for the first media
asset and the second media asset; and
output, to a graphical user interface, the second set of one
or more performance metrics.

20. A computer program product, the computer program product comprising a non-transitory computer readable medium storing computer readable instructions that, when executed by one or more processors, cause the one or more processors to:
obtain one or more attributes relating to a video advertisement;
obtain a first set of one or more performance metrics associated with the one or more attributes;
obtain a template, wherein the template comprises a plurality of blocks, wherein each block of the plurality of blocks corresponds to a temporal segment of video data for a video advertisement and comprises
a block identifier,
a block type,
one or more tags,
one or more video format attributes comprising at least one of a maximum length, a minimum length, a format type, a dimension, or an aspect-ratio, and
one or more placeholders corresponding to one or more types of media assets;
identify, in a first block of the plurality of blocks in the template, a first placeholder corresponding to a first type of media asset, wherein the first block corresponds to a first temporal position;
select a first media asset from a first media library based on first metadata associated with the first media asset, the one or more attributes, the one or more tags for the first block, the first type of media asset, and the first set of one or more performance metrics;
identify, in a second block of the plurality of blocks in the template, a second placeholder corresponding to a second type of media asset, wherein the second block corresponds to a second temporal position different than the first temporal position;
select a second media asset from a second media library based on second metadata associated with the second media asset, the one or more attributes, the one or more tags for the second block, the second type of media asset, and the first set of one or more performance metrics;
generate, using a rendering engine, a first segment of video data comprising the first asset in accordance with the one or more video format attributes of the first block, wherein the first segment of video data corresponds to the first temporal position;
generate, using the rendering engine, a second segment of video data comprising the second asset in accordance with the one or more video format attributes of the second block, wherein the second segment of video data corresponds to the second temporal position;
stitch the first segment of video data comprising the first asset and the second segment of video data comprising the second asset together into a video file comprising a video advertisement in accordance with the first temporal position and the second temporal position;
output the generated video advertisement to an advertisement platform;
obtain, from the advertisement platform, a second set of one or more performance metrics for the first media asset and the second media asset; and
output, to a graphical user interface, the second set of one or more performance metrics.

* * * * *